US006801263B2

(12) United States Patent
Sato et al.

(10) Patent No.: US 6,801,263 B2
(45) Date of Patent: Oct. 5, 2004

(54) LIQUID CRYSTAL DISPLAY, LIQUID CRYSTAL DEVICE AND LIQUID CRYSTAL DISPLAY SYSTEM

(75) Inventors: Seiji Sato, Kanagawa (JP); Hidehiko Sekizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 10/009,112

(22) PCT Filed: Apr. 10, 2001

(86) PCT No.: PCT/JP01/03098

§ 371 (c)(1),
(2), (4) Date: Dec. 7, 2001

(87) PCT Pub. No.: WO01/77744

PCT Pub. Date: Oct. 18, 2001

(65) Prior Publication Data

US 2003/0107686 A1 Jun. 12, 2003

(30) Foreign Application Priority Data

Apr. 10, 2000 (JP) ..................................... P2000-113270

(51) Int. Cl.[7] ....................... G02F 1/1335; C09K 19/02; G03B 21/00; G02B 21/22

(52) U.S. Cl. ............................... 349/15; 349/5; 349/96; 349/175; 353/7; 359/376

(58) Field of Search ................................ 349/5, 15, 96, 349/117, 175, 185; 353/7; 359/376

(56) References Cited

U.S. PATENT DOCUMENTS

| | | | | | |
|---|---|---|---|---|---|
| 5,699,184 | A | * | 12/1997 | Hall | 359/465 |
| 5,784,139 | A | * | 7/1998 | Chigrinov et al. | 349/117 |
| 5,875,055 | A | * | 2/1999 | Morishima et al. | 359/465 |
| 5,903,304 | A | * | 5/1999 | Deter | 348/57 |
| 6,020,941 | A | * | 2/2000 | Ma | 349/15 |
| 6,084,647 | A | | 7/2000 | Hatano et al. | 349/15 |
| 6,337,721 | B1 | * | 1/2002 | Hamagishi et al. | 349/15 |
| 6,344,887 | B1 | * | 2/2002 | Ma et al. | 349/98 |
| 6,417,895 | B1 | * | 7/2002 | Tabata et al. | 349/15 |
| 6,507,380 | B1 | * | 1/2003 | Iijima | 349/96 |

FOREIGN PATENT DOCUMENTS

| | | |
|---|---|---|
| JP | 10-63199 | 3/1998 |
| JP | 10-153771 | 6/1998 |

* cited by examiner

*Primary Examiner*—Tarifur R Chowdhury
(74) *Attorney, Agent, or Firm*—Sonnenschein, Nath & Rosenthal LLP

(57) ABSTRACT

A liquid crystal display apparatus is provided that includes a liquid crystal display device having two polarizing filter arranged on opposite sides of a light modulating unit. The liquid crystal display apparatus also includes a back light on the back side of the liquid crystal display device, two eye polarizing filters fixedly mounted on the back light, an infrared LED arranged on the front side of the liquid crystal display device for illuminating the light on the head of a viewer, and light receiving devices deposed at a present spacing from the front sides of the two eye polarizing filter unit. Moreover, the liquid crystal display apparatus includes a position control unit for processing and comparing the volumes of the light by the light receiving devices to control the position of the back light in the left-and-right direction.

20 Claims, 21 Drawing Sheets

LIQUID CRYSTAL DISPLAY, LIQUID CRYSTAL DEVICE AND LIQUID CRYSTAL DISPLAY SYSTEM

BACKGROUND OF THE INVENTION

This invention relates to a liquid crystal display apparatus, liquid crystal device and liquid crystal display system with which a recorded picture having the stereoscopic information may be viewed as a three-dimensional picture, or a so-called stereo image, using a liquid crystal display. More particularly, it relates to a liquid crystal display apparatus, a liquid crystal device and a liquid crystal display system so designed that, even if the position of a viewer's head is varied, the stereo image can be appreciated satisfactorily.

BACKGROUND ART

Up to now, various techniques of representing an image three-dimensionally were developed, and the representing methods for three-dimensional images were researched and put to use in many fields, such as photography, cinema or television. The methods for demonstrating a three-dimensional image may be classified into a method employing glasses and a method not employing them.

Typical of the system employing glasses are an anaglyphic system in which a viewer wears so-called red glasses or blue glasses, and a system in which a viewer wears polarizing glasses. With these systems, an image presenting parallax is input to left and right eyes of a user whereby the viewer may see the image as a stereo image.

On the other hand, a 3D (three-dimensional) display apparatus of the lenticular system or the parallax barrier system is already in the stage of practical application. With these systems, an area that permits stereo vision is extremely narrow in the transverse direction and is ±several cm, so that limitations are perpetually imposed on user head positions.

So, such a back light splitting system, disclosed in the Japanese Laying-Open Patent Publication H-10-63199, has been proposed as a liquid crystal apparatus in which the stereo image is not impaired even if the user viewing position is slightly offset in the left and right directions with respect to a liquid crystal display screen, and in which the stereo image can be appreciated as the horizontal resolution proper to the liquid crystal display screen is maintained.

The back light splitting system is hereinafter explained. A back light of a routine liquid crystal device is arranged at back of the liquid crystal panel with planar illumination, having an equivalent area to the panel area, in intimate contact with the liquid crystal panel, so that non-directive light is incident on the user's left and right eyes. In the back light splitting system, as contrasted to this conventional system, two back lights, having an appreciably smaller area than a liquid crystal panel, are separately arranged for left and right eyes at the positions spaced apart from the liquid crystal panel a distance slightly larger than the focal length of a convex lens, having a diameter approximately equal to that of the liquid crystal display screen, to take advantage of the directivity of the convex lens.

FIG. 1 shows a display apparatus of a point light source system disclosed in U.S. Pat. No. 2,679,176. A light beam illuminated from a point light source 41 to traverse a convex lens 42 is refracted by the convex lens 42 and converged at a point corresponding to a light converging point 43. If an eye is at the site of the light converging point 43, the convex lens 42 in its entirety shines brightly so as to serve as a back light for a liquid crystal display screen 44 placed in a near-by position.

FIG. 2 is a plan view for a case where the point light source 41 is replaced by a light source for a right eye. In such case, the light beam emitted from a light source for the right eye 45 acts as if it is of the same component as the light beam emitted from the point light source 41 and lights the entire surface of the convex lens 42 to then fall on a right eye 46. The spatial light source by the light source 45 for the right eye causes a light source image area for a right eye 48 to be presented ahead of the convex lens 42. As long as the viewer's right eye is at this light source image area for a right eye 48, the convex lens 42 is lighted brightly uniformly so as to serve as a back light for the liquid crystal display screen 44 placed thereat. If this is applied to left and right eyes, the light source image areas, optimized for a right eye 46 and a left eye 50, that is a light source image area for a right eye 48 and a light source image area for a left eye 49, by two light sources arranged with a center axis C of the convex lens 42 as the boundary, that is a by surface light source 45 for the right eye and by a surface light source 47 for the left eye, are formed, as shown in FIG. 3.

FIGS. 4 and 5 schematically show the state in which the light emitted from the light source 45 for the right eye and by the light source 47 for the left eye, operating as back lights, is sorted by a line-based polarization filter 52 to fall on the right eye 46 and on the left eye 50. In this case, the light illuminated from the surface light source 47 for the left eye having a leftward descending Brewster angle is first directed to the left eye 50 due to the directivity of a Fresnel lens 51. Then, only the image information for the left eye of an even line 54, having a coincident Brewster angle, falls on the left eye 50 by the line-based polarization filter 52. The light illuminated from the surface light source 45 for the right eye having a rightward descending Brewster angle is first directed to the left eye 50 due to the directivity of the Fresnel lens 51. Then, only the image information for the right eye of an odd line 53, having a coincident Brewster angle, falls on the right eye 46 by the line-based polarization filter 52.

So, the left and right parallax information, represented on the lines of the liquid crystal display screen 44, corresponding to the even line 54 and the odd line 53, fall on both eyes of a viewer 13 lying before the liquid crystal display screen 44 to become fused in the user's brain so as to be perceived as a stereo image.

In this case, however, there is presented a problem that, since the left and right parallax information are split at a center axis C, that is at the center of the screen, the same image is incident on both eyes if the viewer 13 moves his or her head in the left and right directions, so that the both eyes enter one area, with the result that the image becomes a two-dimensional image to render the stereo vision impossible On the other hand, if a 3D display apparatus is formed by a liquid crystal display device made up of polarizing filters 55, 56, glass substrates 57, 58, a half-wave plate 59, a color filter 60, a liquid crystal display screen 61, a protective film 62 and a transparent electrode 63, that is in a system in which the polarizing filter 56 is formed on the glass substrate 58 on the light incident side of the surface light source, the image information on a line which inherently should not be visible is superposed as crosstalk on he inherent image information if the line of sight of the viewer 13 is in the direction indicated by a dotted line arrow in FIG. 6, thus producing a stereo image extremely difficult to view.

That is, if the viewer 13 raises or lowers his or her head, the light transmitted through the half-wave plate 59 of a preset line falls astride two lines of a color filter 60 and a liquid crystal display surface 61, without coinciding with a line of the color filter 60 and the liquid crystal display surface 61 associated with this line. For example, the light which should fall on the right eye 46 also falls on the line for left eye of the color filter 60 and the liquid crystal display surface 61 to get to the left eye 50 to produce the crosstalk.

It should be noted that, since the vertical pitch of a 10.4-inch SVGA (600 by 800 pixels) is 0.264 mm, the light beam traversing a polarizing filter on a glass substrate 1 mm in thickness, if deviated ±15 degrees in the vertical direction, becomes wholly the illumination for the adjacent line, so that a stereo image having the convex and concave relation inverted is viewed. Even if the angle of offsetting is less than ±15 degrees, the degree of freedom in the vertical direction is well-nigh lost due to crosstalk. Thus, in the absence of the compensation for the difference in the seated height or in the elevation angle of the liquid crystal display surface, more constraint than that experienced in the left and right direction is imposed.

For coping with this inconvenience, a variety of techniques have been proposed which detect the head position of the viewer 13 to control an area allowing for stereo vision in accordance with detected results. For example, as methods for detecting the viewer's head position, there are known such a method consisting in loading a magnetic sensor on the head and such a method consisting in using a video camera to detect the head image. However, with these methods, the viewer 13 may feel that a foreign object set on his or her head is cumbersome, or the cost of the product is raised. So, there has as yet not been introduced a handy 3D liquid crystal display apparatus in which the viewer 13 is able to enjoy an optimum stereo image when he or she simply sits before a liquid crystal display surface, even though he or she moves his or her head slightly in the vertical and/or left and right directions.

SUMMARY OF THE INVENTION

In view of the above-described status of the art, it is an object of the present invention to provide a liquid crystal display apparatus, liquid crystal device and liquid crystal display system in which a stereo image is not impaired and hence a high precision stereo image can be enjoyed even if the viewing position of the viewer is deviated slightly in the vertical and/or left and right directions with respect to the liquid crystal display surface.

For accomplishing the above object, the present invention provides a liquid crystal display apparatus including a liquid crystal display device having light modulating means, a first polarizing filter, arranged on the front surface of the light modulating means and a second polarizing filter arranged on the back side of the light modulating means, the light modulating means including a pair of transparent electrode plates and liquid crystals sealed therein, a first light source arranged on the back side of the liquid crystal display device, the first light source having a polarizing filter unit for the right eye and a polarizing filter unit for the left eye, the polarizing filter unit for the right eye and a polarizing filter unit for the left eye having respective different directions of polarization and being fixedly mounted on left and right portions on a front surface thereof, optical means arranged on the back side of the liquid crystal display device for collecting the illuminating light from the light source for illuminating the so-collected light on the liquid crystal display device, a second light source arranged on the front side of the liquid crystal display device for illuminating the light on the head of a viewer, light receiving devices arranged on the front sides of the polarizing filter unit for the right eye and the polarizing filter unit for the left eye at a preset spacing therefrom, and position control means for processing and comparing the volumes of the received light in the light receiving devices to control the position of the first light source in the left-and-right direction. The image information for the right eye and that for the left eye are alternately displayed on the light modulating means every horizontal line in agreement with light transmitting lines in the first and second polarizing filters, the light illuminated from the first light source through the polarizing filter unit for the right eye is incident on the right eye of the user through the liquid crystal display device, the light illuminated from the first light source through the polarizing filter unit for the left eye is incident on the left eye of the user through the liquid crystal display device, independently of the light from the first light source through the polarizing filter unit for the right eye. The volume of light illuminated from the second light source and reflected by the head of the user is sensed by the light receiving devices to detect the movement in the left-and-right direction of the head of the viewer. The position control means causes automatic movement of the position of the first light source in the left-and-right direction in agreement with the detected movement.

That is, in the liquid crystal display apparatus, according to the present invention, the light from the polarizing filter for the right eye is transmitted only through every other line on which an image for the right eye is projected to fall on the right eye of the viewer, whilst the light from the polarizing filter for the left eye is transmitted only through every other line on which an image for the left eye is projected to fall on the left eye of the viewer, so that a stereo image may be viewed due to three-dimensional perception derived from the parallax between the two eyes. So, a regular stereo image may be viewed within the ranges of the stereo vison areas of the left and right eyes.

The light illuminated from the second light source and reflected by the viewer's head is perceived by the light receiving device to sense the movement in the left-and-right direction of the viewer's head to cause the first light source position to be automatically shifted in the left-and-right direction in keeping with the movements of the viewer's head.

Since the light receiving device is fixedly mounted on the first light source, the light receiving device is moved with movement of the first light source. The movement of the first light source ceases when the light receiving device gets to the preset position. Thus, even if the viewer's head is moved in the left-and-right direction, the viewer head position is automatically tracked to cause the stereo vision area to be moved to a proper position for appreciating the stereo vision image.

On every other horizontal line of the light modulating means, the image for the right eye and that for the left eye are projected. So, the totality of the images for the right and left eyes are directly incident selectively on the right and left eyes of the viewer, thus not detracting from the horizontal resolution.

The present invention also provides a liquid crystal display device including first image separating means for separating the light illuminated from a light source depending on the direction of polarization, light modulation means having liquid crystals sealed within a pair of transparent electrode plates, the light modulation means modulating the intensity of light transmitted through the first image separating means, second image separating means for separating the light transmitted through the light modulating means depending on the direction of polarization, and a pair of substrates for clamping at least the first image separating means and the modulating means.

That is, in the liquid crystal display device according to the present invention, in which the first image separating means is arranged next to the light modulating means, the distance between the first image separating means and the light modulation means becomes shorter. The result is that the image information on a line which inherently should not be visible due to the distance between the first image separating means and the light modulation means may be prevented from entering the eye as cross-talk in superimposition on the inherent image information.

The present invention also provides a liquid crystal display system employing two, namely left and right, polarizing filters having respective different directions of polarization, including a liquid crystal display device, the liquid crystal display device including, in turn, first image separating means for separating the light illuminated from a light source depending on the direction of polarization, light modulation means having liquid crystals sealed within a pair of transparent electrode plates, the light modulation means modulating the intensity of light transmitted through the first image separating means, second image separating means for separating the light transmitted through the light modulating means depending on the direction of polarization, and a pair of substrates for clamping at least the first image separating means and the modulating means.

That is, with the liquid crystal display system according to the present invention, in which the first image separating means is arranged next to the light modulating means, the distance between the first image separating means and the light modulation means becomes shorter. The result is that the image information on a line which inherently should not be visible due to the distance between the first image separating means and the light modulation means may be prevented from entering the eye as cross-talk in superimposition on the inherent image information.

Other objects and specific advantages of the present invention will become more apparent from reading the following description of the preferred embodiments thereof when read in conjunction with the drawings and the claims.

DETAILED DESCRIPTION OF THE INVENTION

Figure 1:
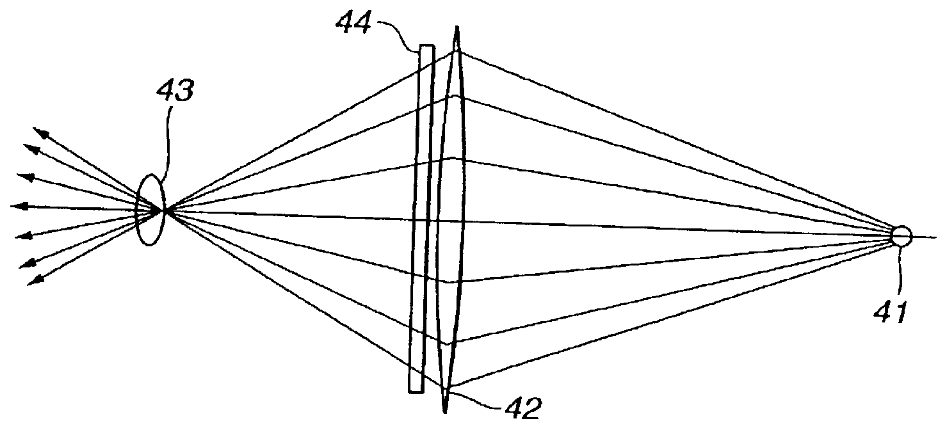
FIG. 1 is a longitudinal cross-sectional view for illustrating the point light source system.
Figure 2:
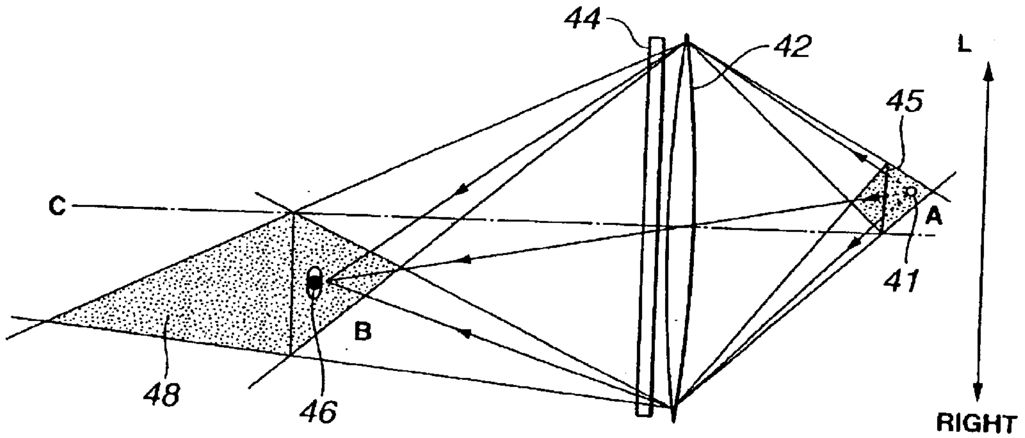
FIG. 2 is a plan view showing a light source area in case a surface light source for a right eye is substituted fro a point light source in a point light source system.
Figure 3:
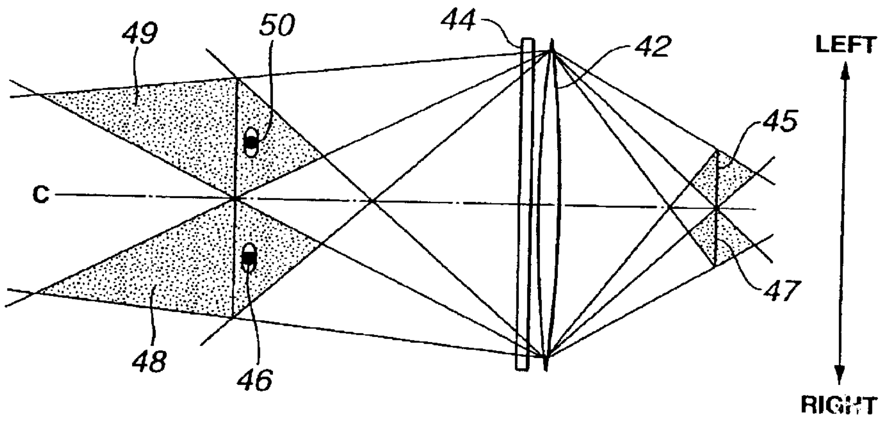
FIG. 3 is a plan view showing a light source area in case a surface light source for a right eye and a surface light source for a right eye are substituted fro a point light source in a point light source system.
Figure 4:
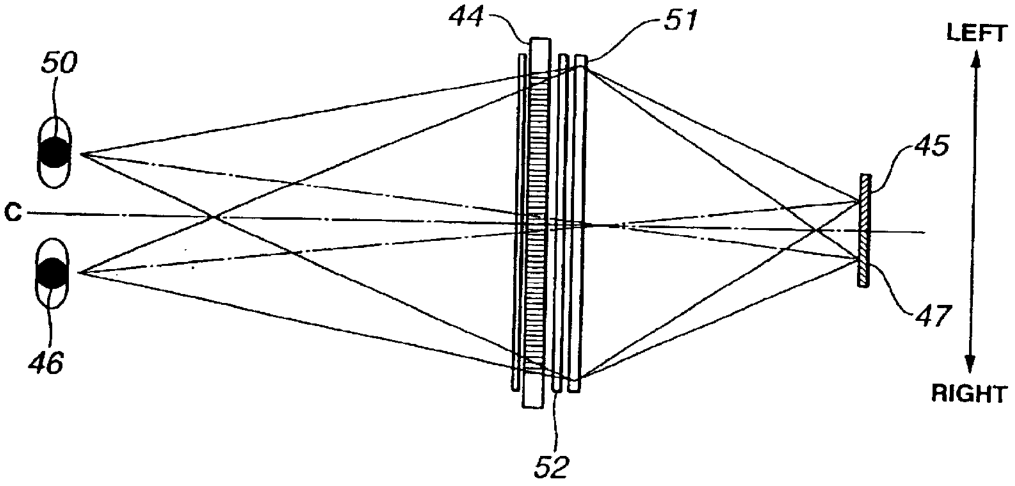
FIG. 4 is a plan view showing the state in which the light emitted from a back light is sorted by a line-based polarizing filter and subsequently falls on left and right eyes.
Figure 5:
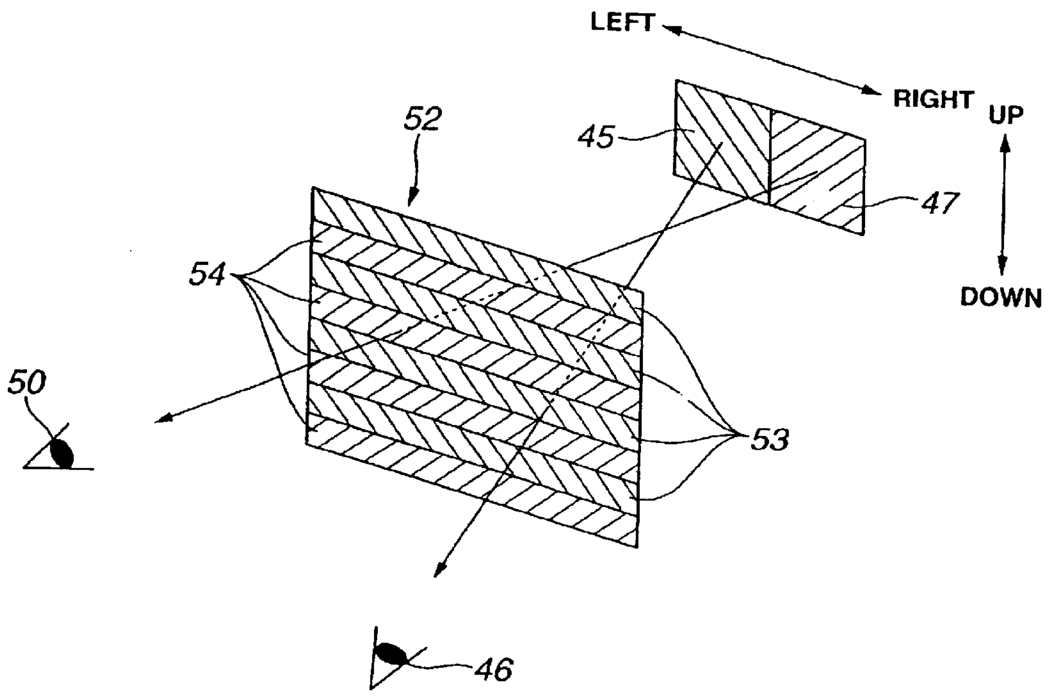
FIG. 5 is a perspective view showing the state in which the light emitted from a back light is sorted by a line-based polarizing filter and subsequently falls on left and right eyes.

Referring to the drawings, preferred embodiments of the present invention will be explained in detail. The present invention is not limited to the embodiments, now explained, but may be modified without depaerting from its scope.

First Embodiment

Figure 7:
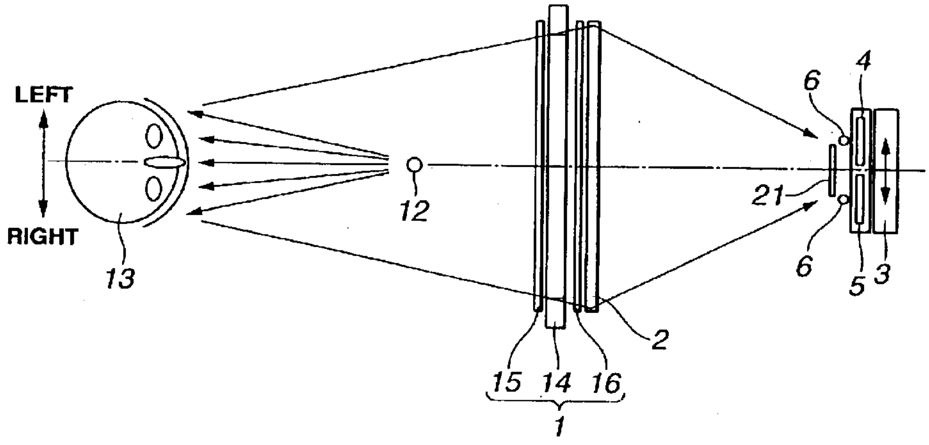
FIG. 7 is a schematic plan view showing a liquid crystal display apparatus of a first embodiment of he present invention.

FIG. 7 is a schematic plan view showing a liquid crystal display apparatus embodying the present invention.

First, the structure of the liquid crystal displat apparatus is explained. On the back surface of a liquid crystal display device 1, a Fresnel lens 2, operating as a convex lens, as optical means, is arranged at a preset distance therefrom.

On the back side of the Fresnel lens 2, there is mounted, at a preset distance from a Fresnel lens 2, a back light 3, as a light source for lighting the liquid crystal display device 1 from its back side. On the front side of this back light 3, that is, on its side irradiated with the illuminating light, there are fixedly mounted a polarizing filter unit for a right eye 4 and a polarizing filter unit for a left eye 5 on the left and right sides of the center of the back light 3 as a boundary. The polarizing filter unit for a right eye 4 and the polarizing filter unit for a left eye 5 are arranged as linear polarizing filters, having the directions of polarization extending at rigth angles to each other. Here, the polarizing filter unit for a right eye 4 has a rightward ascending plane of polarization, whilst the polarizing filter unit for a left eye 5 has a leftward ascending plane of polarization.

Figure 8:
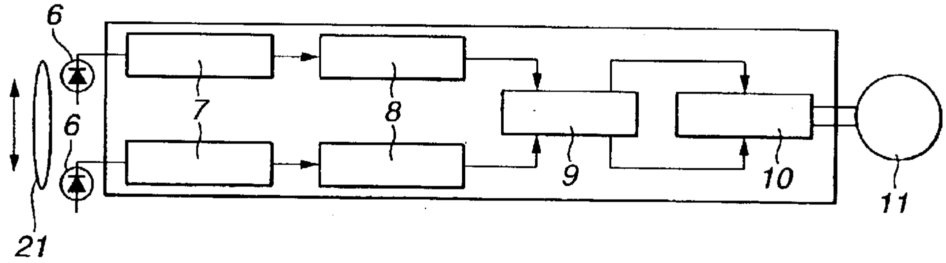
FIG. 8 is a schematic view showing the structure of a liquid crystal apparatus of the first embodiment shown in FIG. 7.

On the front sides, that is the light irradiated sides, of the polarizing filter unit for a right eye 4 and the polarizing filter unit for a left eye 5, there are aranged left and right light receiving devices 6, 6 at approximately equal distances from the boundary between the polarizing filter unit for a right eye 4 and the polarizing filter unit for a left eye 5 for receiving the reflected infrared light illuminated from an infrared LED 12 as a head followup light source. To these two light receiving devices 6 is connected a back light position controller shown in FIG. 8.

The back light position controller is made up of a preamplifier 7, an amplifier 8, a differential amplifier 9 and a forward/reverse inverting driving circuit 10. To this forward/reverse inverting driving circuit 10 is connected back light movement means, such as a motor 11. In the back light position controller, the volumes of light received by the left and right light receiving devices 6 are amplified and input to a differential amplifier 9, which then compares the volumes of the input light to the two left and right light receiving devices 6 to output a difference therebetween as data to the forward/reverse inverting driving circuit 10. Based on this data, the forward/reverse inverting driving circuit 10 issues a command of shifting the position of the back light 3 to back light position shifting means. Meanwhile, in finding the differntial between the received light volumes of the two left and right light receiving devices 6, the position of the back light 3 may be shifted such as to raise the level of the light volumes of the two left and right light receiving devices 6, that is to permit more light to be received by these devices, or such as to lower the level of the light volumes of the two left and right light receiving devices 6, that is to permit less light to be received by these devices.

On the front surface of the liquid crystal display device 1, there is mounted e.g., an infrared LED 12, as a head position followup light source, at a preset distance from the liquid crystal display device. The infrared LED 12 illuminates the head position followup infrared light to a viewer 13.

Figure 9:
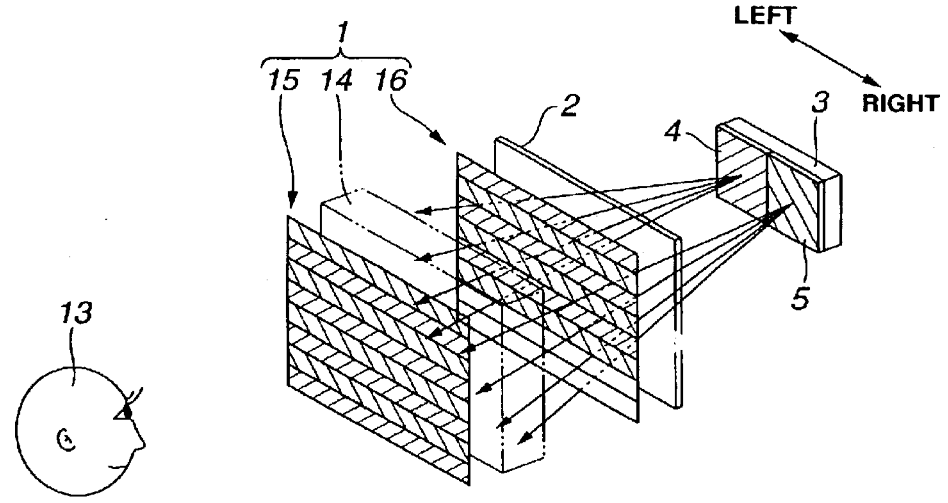
FIG. 9 is an exploded perspective view of the liquid crystal display apparatus.

The liquid crystal display device 1 is of the light transmitting type and, as shown in FIG. 9, includes a light modulator 14, comprised of liquid crystal sealed between a pair of transparent electrode plates, as later explained, a first polarization filter 15 arranged on the front surface of the light modulator 14, that is towards the viewer 13, and a second polarization filter 16, arranged on the front side of the light modulator 14, that is towards the back light 3. The light modulator 14 includes liquid crystals twisted 90° in a pair of orientation films. If no voltage is applied across a pair of the orientation films, the incident light is radiated as its polarization surface is rotated through 90° and, if voltage is applied across a pair of the orientation films, the incident light is directly radiated, without rotating its polarization plane. The first and second polarizing filters 15, 16 are constructed and arranged so that rightward ascending linear polarizing filter line and leftward ascending linear polarizing filter line, extending at right angles to each other, are arranged alternately every horizontal line of the light modulator 14, and so that the polarization directions of the rightward ascending linear polarizing filter 15 and the leftward ascending polarizing filer lines of the first and second polarizing filters 15, 16 extend at right angles to each other. So, the light emitted by the back light 3 and which has traversed the polarizing filter unit for a right eye 4 and the polarizing filter unit for a left eye 5 are incident only at the rightward ascending linear polarizing filter line and at the leftward ascending linear polarizing filter line of the same polarization plane, the light is incident every other horizontal line, with the incident light being transmitted or interrupted when voltage is not applied to or applied to the light modulator 14, respectively.

The light modulator 14 of the liquid crystal display device 1 is constructed and designed so that the image information for right eye and that for left eye are demonstrated alternatively in agreement with the light transmitting lines of the two polarizing filters 15, 16.

The operation of the above-described configuration is hereinafter explained. The light emitted by the back light 3 and transmitted through the polarizing filter unit for a right eye 4 traverses the Fresnel lens 2 and, when it gets to the liquid crystal display device 1, it is incident only at the rightward ascending linear polarizing filter line, every other horizontal line, having the same polarization plane as that of the polarizing filter unit for a right eye 4. The light incident every other horizontal line is radiated depending on the driving state of the light modulator 14, with the radiated light being illuminated only in the right eye zone of the viewer 13. The light emitted by the back light 3 and transmitted through the polarizing filter unit for a left eye 5 gets only to the liquid crystal display device 1 in the same way as above described to fall only at the leftward ascending linear polarizing filter line, every other horizontal line, having the same polarization plane as the polarizing filter unit for a left eye 5. The light thus incident every other horizontal line is radiated depending on the driving state of the light modulator 14, with the radiated light being illuminated only in the left eye zone for the viewer 13.

In the light modulator 14, an image for the right eye and that for the left eye are displayed every other horizontal line in keeping with the light transmitting lines of the first and second polarizing filters 15, 16, so that, if the viewer 13 views the liquid crystal display device 1 in the stereo vision area, only the image for the right eye is incident on the right eye, whilst only the image for the left eye is incident on the left eye, respectively independently of each other. Thus, the viewer may see the image as a stereo image by three-dimensional perception derived form the parallax.

Figure 10:
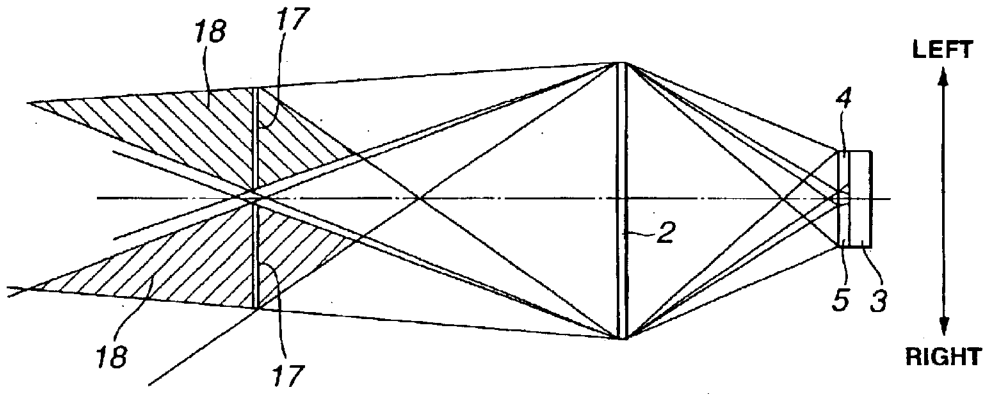
FIG. 10 is a plan view showing a stereo vision area.
Figure 11:
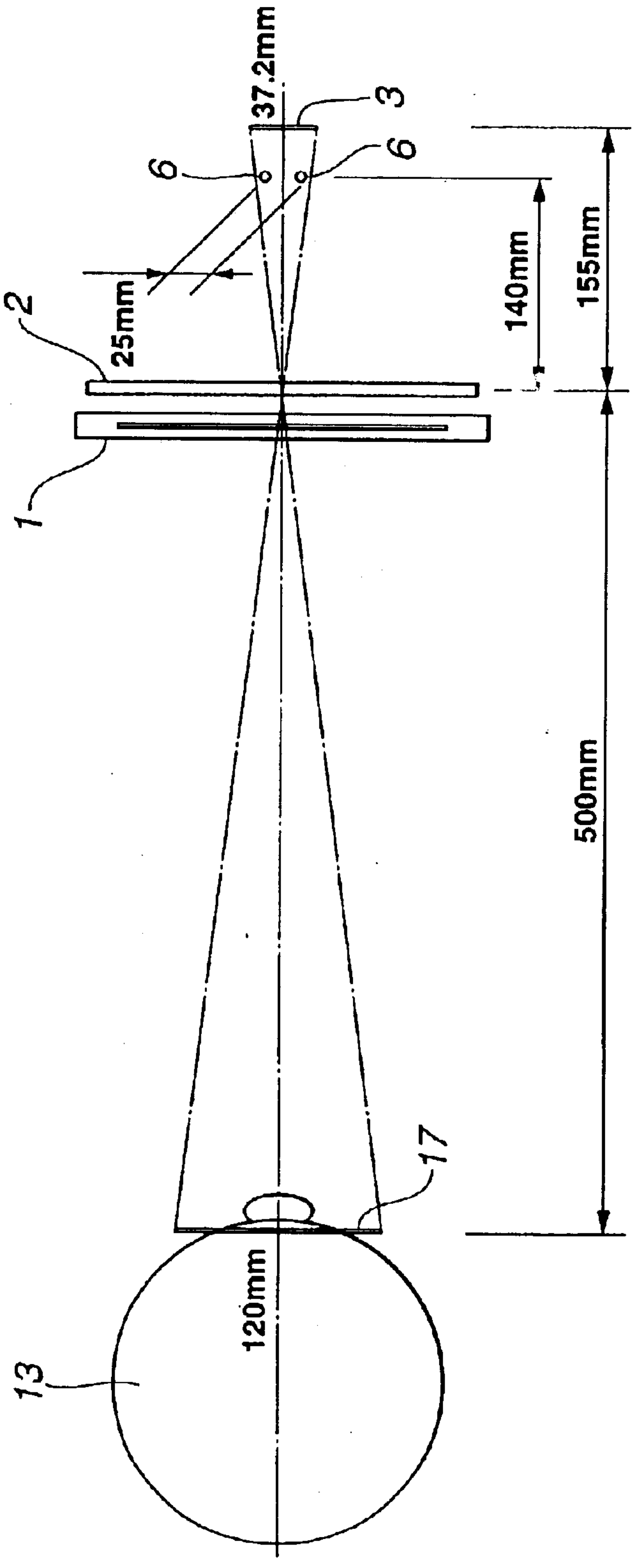
FIG. 11 is a plan view for illustrating the relation of distance between the viewer, Fresnel lens and the back light when the viewer is viewing a 8.4 inch liquid crystal display screen.

The stereo vision area is now explained. Referring to FIG. 10, the light source surface of the back light 3, on the front surface of which is arranged the polarizing filter unit for a right eye 4, forms a real image 17, by the Fresnel lens, as an image of the light source. In effect, the light source area as a space is present as a light source area. If the right eye is positioned in this area, the entire area of the Fresnel lens 2 is illuminated homogeneously. For the light source surface of the back light 3, on the front surface of which the polarizing filter unit for a left eye 5 is arranged, a similar light source area and a light source area as a space are present, so that, on the whole, a stereo vision area 18 shown in FIG. 10 is formed. As may be seen from FIG. 10, an area which permits proper light incidence on the left and right eyes is limited, so that, if the left and right eyes are off from the respective stereo vision areas 18, the balance in the parallax is disturbed so that the image cannot be seen as a stereo image based on the three-dimensional perception. So, according to the present invention, if the angle in the left and right direction directions with which the viewer 13 sees the liquid crystal display surface, that is if the eye of the viewer 13 is off from the stereo vision areas 18, the relative position between the viewer 13 and the back light 3 with the liquid crystal display device 1 in-between is automatically adjusted, by way of correcting the angle of field of view, to assure automatic simplified correction of the stereo vision areas 18 to high accuracy.

The automatic correction of the relative position between the viewer 13 and the back light 3, with the interposition of the liquid crystal display device 1, is hereinafter explained. According to the present invention, an infrared LED 12, for example, is used as a light source for sensing the relative position between the viewer 13 and the back light 3, with the interposition of the liquid crystal display device 1, as shown in FIG. 7. The infrared LED 12 is arranged between the liquid crystal display device 1 and the viewer 13 and, when seen from above, emits the infrared light to the head of the viewer 13. The infrared light, illuminated from th infrared LED 12 to the viewer 13, impinges on the head of the user 13, so as to be reflected thereby to travel through the Fresnel lens 2 in a direction opposite to the direction of the light illuminated from the back light 3, that is in a direction proceeding from the viewer 13 towards the back light 3, to form an image on the back surface of the liquid crystal display device 1. The light illuminated by the infrared LED 12 and reflected by the observer 13 is received by the two left and right light receiving devices 6 arranged on the front sides of the polarizing filter unit for the right eye 4 and the polarizing filter unit for the left eye 5, that is on the light illuminating side. The arraying positions of the two left and right light receiving devices 6 are proximate to the polarizing filter unit for the right eye 4 and the polarizing filter unit for the left eye 5 at approximately equal positions in the left and right directon from the boundary of the polarizing filter unit for the right eye 4 and the polarizing filter unit for the left eye 5. The distance between the light receiving devices 6 may be optionally set depending on operating conditions, such as the size of the liquid crystal display apparatus.

If, for example, the optimum position of the viewer 13 appreciating the 8.4 inch liquid crystal display surface is 500 mm from the Fresnel lens 2 having the focal length of 118 mm, and if the approximate parallel surface of the head of the viewer 13 is 120 mm, the light illuminated by the infrared LED 12 and reflected by the head of the viewer 13 forms an image 37.2 mm in width at a site on the back surface side of the Fresnel lens 2 which is 140 mm apart from the Fresnel lens 2. If, for example, the two left and right light receiving devices 6 are arranged on the back surface of the Fresnel lens 2 at a position 140 mm apart from the Fresnel lens 2, the image of the head of the viewer 13 is blurred along its boundary line 33 mm in width. At this position, the two left and right light receiving devices 6 are receiving the reflected light homogeneously.

The width of the image of the head part is varied with the position in the fore-and-aft direction of the head, that is with the distance from the Fresnel lens 2. If, for example, the head of the viewer 13 is off 750 mm from the Fresnel lens 2, the image of the head of the viewer 13 becomes an image 22.4 mm in width at the position of the two left and right light receiving devices 6. In this case, the head itself of the viewer 13 is not planar and hence the neighborhood of the image is blurred.

So, the interval between the two left and right light receiving devices 6 is set to approximately 25 mm. By so setting, the two left and right light receiving devices 6 are uniformly receiving the infrared light illuminated from the infrared LED 12 and reflected by the viewer 13.

Figure 12:
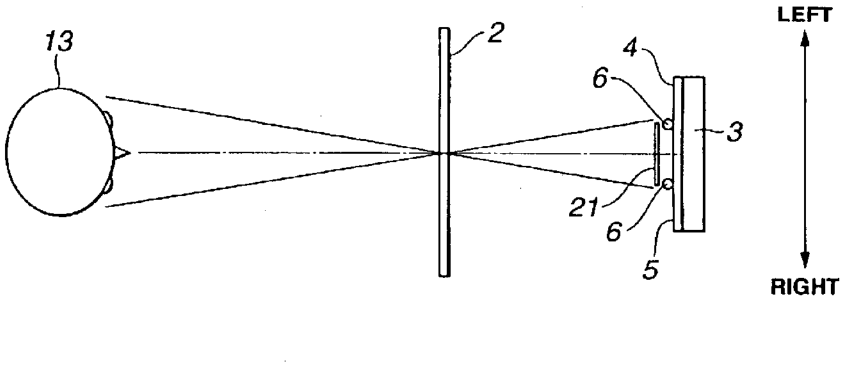
FIG. 12 is a plan view showing the state in which an image of the viewer's head is evenly formed with respect to two left and right light receiving devices.

FIG. 12 shows an optimum state for appreciating a stereo image, that is a state in which the image of the head of the viewer 13 is evenly formed with respect to the two left and right light receiving devices 6. In such state, the head of the viewer 13 and the center of the Fresnel lens 2, that is the center position of the two left and right light receiving devices 6, when viewed from above, are arrayed on a straight line.

Figure 13:
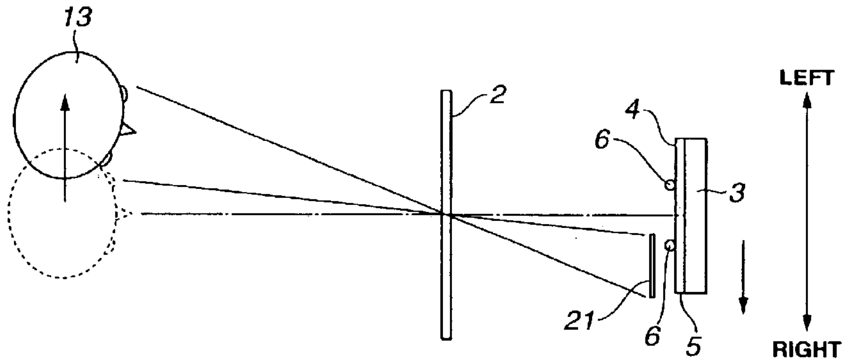
FIG. 13 is a plan view showing the state in which an image of the viewer's head is offset towards right from the viewer towards the Fresnel lens with respect to two left and right light receiving devices.

Then, if the head of the viewer 13 is moved leftward towards the Fresnel lens 2 by the movement of the viewer 13, such that the image of the head of the viewer 13 is moved rightward towards the Fresnel lens 2 due to movement of the viewer 13, there is produced a level difference in the volumes of the light received by the two left and right light receiving devices 6, as shown in FIG. 13. The forward/reverse inverting driving circuit 10 of the back light position controller is preset so that, if the level difference is produced in the received light volumes in the two left and right light receiving devices 6, a command is issued to cause movement of the back light 3 in the direction towards that one of the two left and right light receiving devices having a larger volume of the received light, that is in a drection of movement of the image of the head of the viewer 13. In the present case, since the image of the head of the viewer 13 has been moved rightwards towards the Fresnel lens 2 and the light receiving device 6 lying rightwards as seen from the viewer 13 is receiving more light, the forward/reverse inverting driving circuit 10 of the back light position controller issues a command signal for causing rightward movement of the back light 3 as seen from the viewer 13, whereby the back light 3 is moved rightwards as viewed from the viewer. The two left and right light receiving devices 6 are arranged for performing the movement in unison with the back light 3 so that the two left and right light receiving devices 6 are also moved rightwaards, as seen from the viewer 13, along with the back light 3. So, the back light 3 and the two left and right light receiving devices 6 are moved as far as a position in which the levels of the received light volumes in the two left and right light receiving devices 6 equal to each other.

Figure 14:
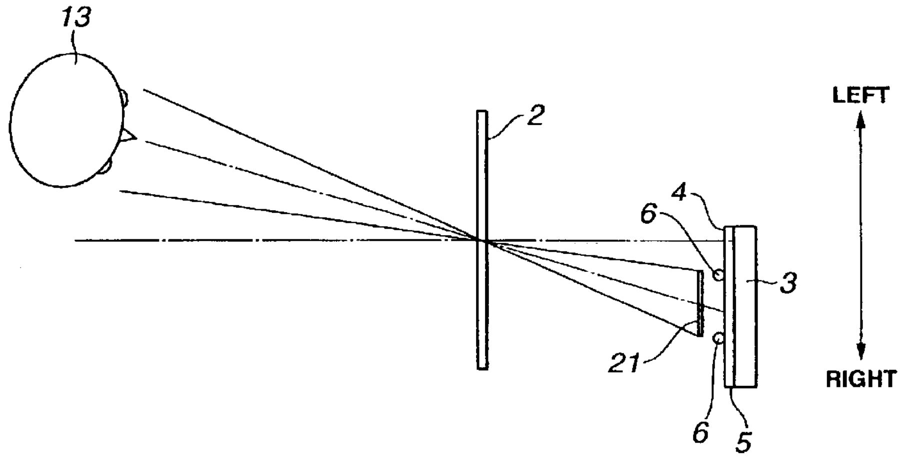
FIG. 14 is a plan view showing the state in which the back light position has been corrected from the state in which the image of the viewer's head is offset towards right from the viewer towards the Fresnel lens with respect to two left and right light receiving devices.

Then, such a state is reached in which the head of the viewer 13, the center of the Fresnel lens 2 and the center position between the two left and right light receiving devices 6, that is the boundary between the polarizing filter unit for the right eye 4 and the polarizing filter unit for the left eye 5 are aligned, as shown in FIG. 14. Simultaneously, the stereo vision area 18, shown in FIG. 10, is moved to an appropriate position for the viewer to appreciate the stereo vision image.

If the head of the viewer 13 is moved rightwards from the viewer 13 towards the Fresnel lens 2, such that the image of the head of the viewer 13 has been moved leftwards from the viewer 13 towards the Fresnel lens 2, the light receiving device 6 lying leftwards as seen from the viewer 13 is receiving more light. So, the forward/reverse inverting driving circuit 10 of the back light position controller issues a command for causing movement of the back light 3 leftwards as seen from the viewer 13, whereby the back light 3 is moved leftwards as seen from the viewer 13. Similtaneously, the stereo vision area 18 also is moved to a proper position for the viewer to appreciate the stereo image.

Figure 15:
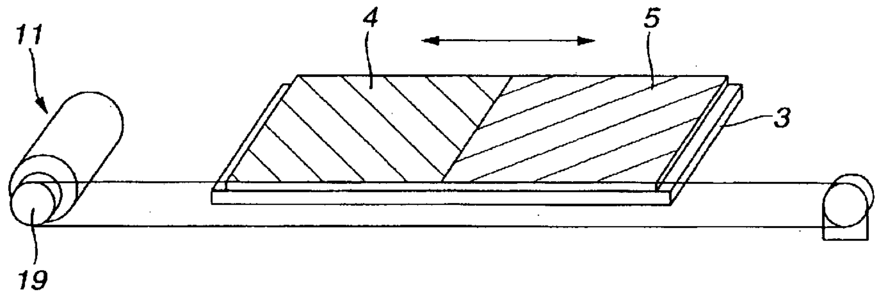
FIG. 15 is a perspective view showing the state in which the back light is retained by a wire wound about a pulley of a motor fitted with a speed reducer.

For causing movement of the two left and right light receiving devices 6 along with the back light 3, such a method may be used which consists in retaining the back light by a wire wound about a pulley 19 of a motor 11 fitted with a speed reducer, and rotationally driving the motor 11 to cause movement of the back light 3, as shown in FIG. 15.

Figure 16:
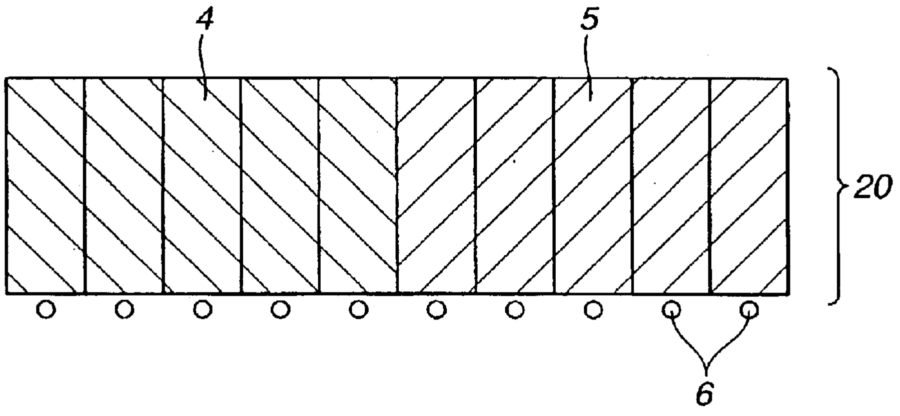
FIG. 16 shows a state in which a strip-shaped polarizing filters for right and left eyes are formed by a liquid crystal having a variable Brewster angle.
Figure 17:
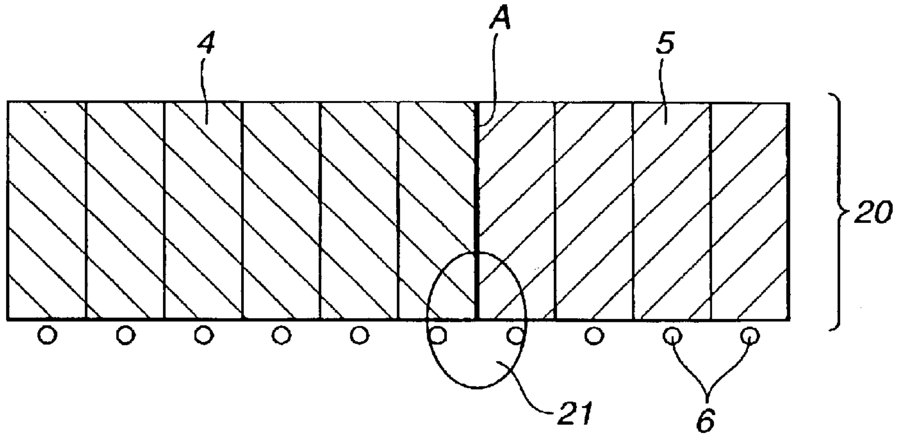
FIG. 17 shows a state in which a voltage is applied to the liquid crystal having a variable Brewster angle to change the boundary between the polarizing fillers for the right and left eyes to a position A.
Figure 18:
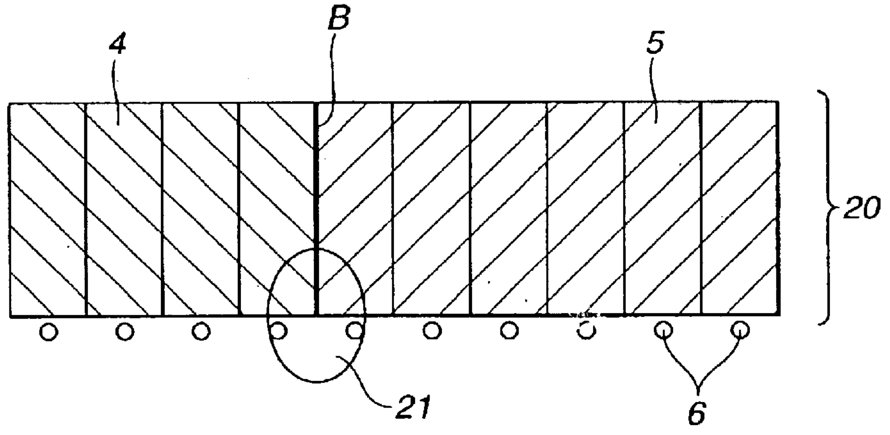
FIG. 18 shows a state in which a voltage is applied to the liquid crystal having a variable Brewster angle to change the boundary between the polarizing filters for the right and left eyes to a position B.

Instead of moving the back light 3 itslf, the boundary position between the polarizing filter unit for the right eye 4 and the polarizing filter unit for the left eye 5 may be shifted (polarized light back light system). In such case, the back light 3 elongated in the left and right direction is used, and a number of strip-shaped Brewster angle variable type liquid crystals 20, as the variable Brewster angle devices capable of controlling the Brewster angle by voltage application, are arranged as the polarizing filter unit for the right eye 4 and the polarizing filter unit for the left eye 5, whilst a large number of light receiving devices 6 are arranged on each strip-shaped Brewster angle variable type liquid crystal 20, as shown in FIG. 16. The polarizing filter unit for the right eye 4 and the polarizing filter unit for the left eye 5 are formed by applying the voltage to the Brewster angle variable type liquid crystals 20, so that, in case the image 21 of the head of the viewer 13 is formed as shown in FIG. 17, the Brewster angles cross each other with the boundary A of the strip-shaped Brewster angle variable type liquid crystals 20 as the boundary. The polarizing filter unit for the right eye 4 and the polarizing filter unit for the left eye 5 are also formed by applying the voltage to the Brewster angle variable type liquid crystals 20, so that, in case the image 21 of the head of the viewer 13 is formed as shown in FIG. 18, the Brewster angles cross each other with the boundary B of the strip-shaped Brewster angle variable type liquid crystals 20 as the boundary. With this structure, the position of the back light 3 illunminating the liquid crystal display device 1 can be changed by causing movement of the boundary position between the polarizing filter unit for the right eye 4 and the polarizing filter unit for the left eye 5 without causing movement of the back light 3 itself.

The infrared LED 12 is a light source emitting the infrared light. By illuminatiung the infrared light on the viewer 13 using this infrared LED 12, the viewer does not exprerience an alien feeling, while there is no risk of injuring the eyes when the light falls on both eyes, thus assuring a safe operation. This light source is not limited to the infrared LED 12 such that any suitable light source that is unlikely to injure the eyes of the viewer 13 may naturally be employed.

In the above-described structure, the Fresnel lens 2 is arranged on the back side of the liquid crystal display device 1. This, however, is merely illustrative, such that the Fresnel lens 2 may be arranged on the light illuminating side of the liquid crystal display device 1.

Figure 19:
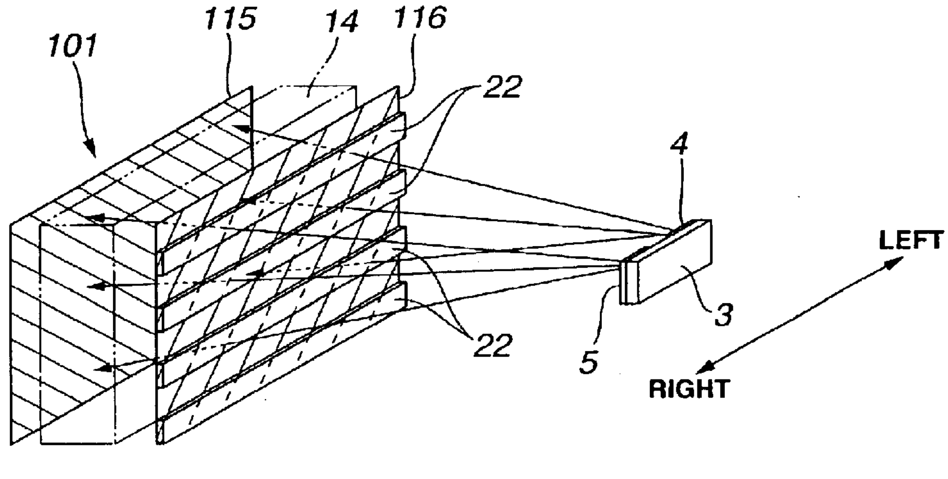
FIG. 19 is an exploded perspective view of a liquid crystal display device of a first modification of the first embodiment of the present invention.

As a first modification of the first embodiment, described above, a liquid crystal display device 101, configured as shown in FIG. 19, may be used.

Referring to FIG. 19, a liquid crystal display device 101 includes a light modulator 14 and two polarizing filters 115, 116 arranged on both sides of the light modulator 14. The structure of the light modulator 14 is the same as described above. The two polarizing filters 115, 116 are linear polarizing filters having the same plane of polarizations in their entirety, with the respective light plane of polarizations lying at right angles to each other. The polarizing filter 116 on the side back light 3 is fitted with half wave plates 22 every other horizontal line of the light modulator 14. These half wave plates 22 are arranged for radiating the light as the plane of polarization of the incident light is rotated 90°.

Figure 21:
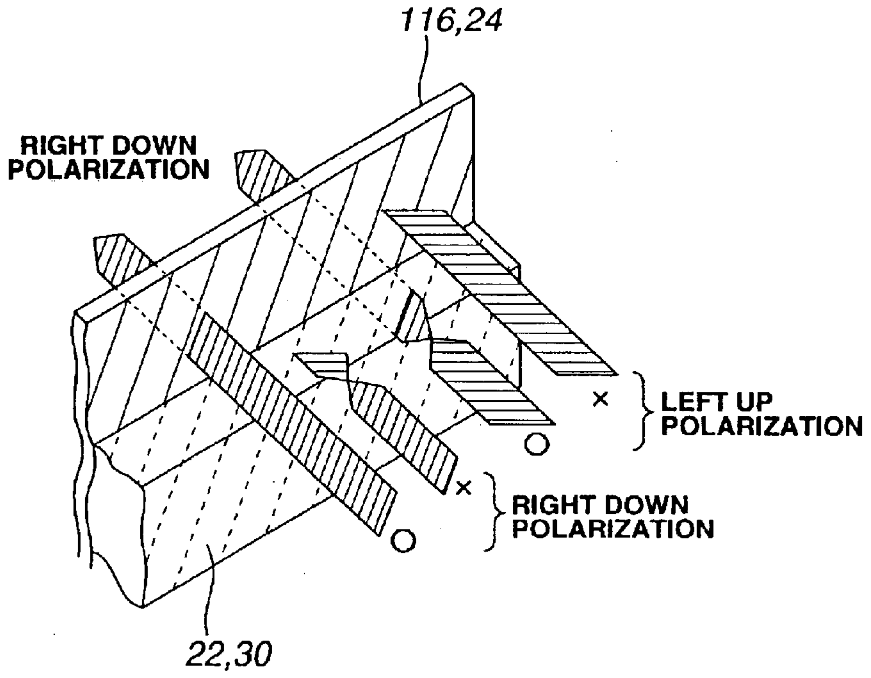
FIG. 21 shows the state of light incidence on the back light side polarizing filter.

In FIG. 21, the polarized light in the leftward ascending direction cannot traverse the polarizing filter line in the absence of the half wave plates 22. If these half wave plates 22 are provided, the polarized light in the leftward ascending direction is rotated 90° to prove the polarized light in the rightward ascending direction and hence can traverse the polarizing filter line. Conversely, the polarized light in the rightward ascending direction can traverse the polarizing filter line in the absence of the half wave plates 22. If these half wave plates 22 are provided, the polarized light in the rightward ascending direction is rotated 90° to prove the polarized light in the leftward ascending direction and hence cannot traverse the polarizing filter line. The direction of polarization of the light which has just entered the polarization filter on the side back light 3 is unexceptionally in the rightward ascending direction so that the direction of polarization towards the viewer 13 may unexceptionally be in the leftward ascending direction to permit facilitated fabrication.

Figure 20:
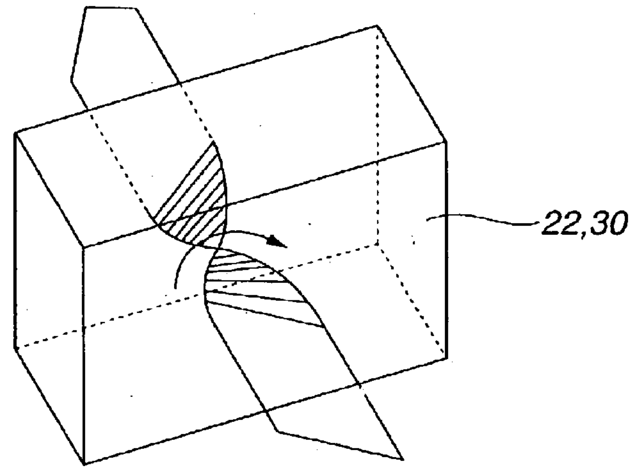
FIG. 20 shows the polarized state of the light incident on the half-wave plate.

As a second modification of the liquid crystal display device 1 of the above-described first embodiment, a liquid crystal display device 201 configured as shown in FIG. 20 may be used.

Figure 22:
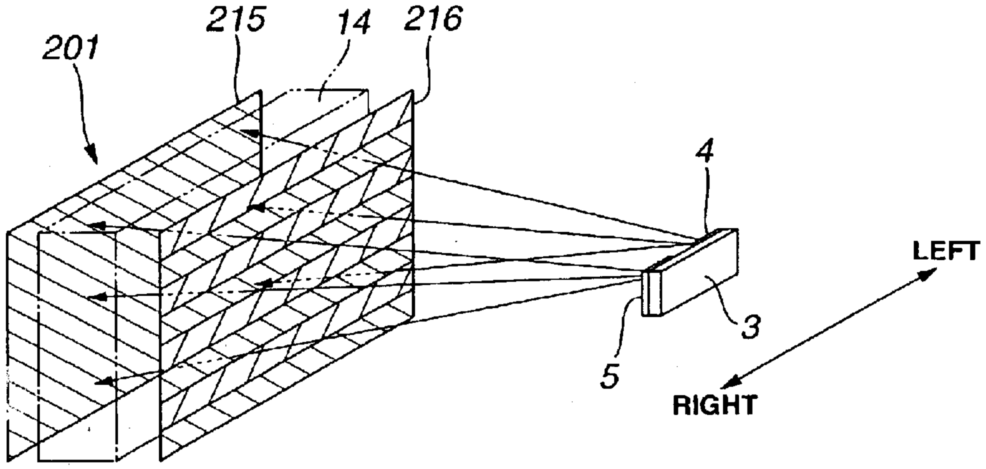
FIG. 22 is an exploded perspective view of a liquid crystal display device of a second modification of the first embodiment of the present invention.

In FIG. 22, the liquid crystal display device 201 includes a light modulator 14 and two polarizing filters 215, 216 provided on both sides thereof. Although the light modulator 14 and the polarizing filter towards the back light 3 are similar in structure to those of the first embodiment, the polarizing filter towards the viewer 13 is formed by a linear polarizing filter having the same plane of polarization over its entire surface. It should be noted that this plane of polarization is the same as the rightwardly ascending plane of polarization of the linear polarizing filter or as the leftwardly ascending plane of polarization of the linear polarizing filter on the side back light. In the lines of the polarizing filters 215, 216 having the sane direction of polarization, the driving condition (driving voltage) is set in a reverse fashion relative to each other. In the present second modification, the polarizing filters on the side viewer 13 may be set to the same polarization dirrection over the entire surfaces, thus again enabling inexpensive fabrication.

In the above-described first embodiment and in the above-described first and second embodiments, in which linear polarizing filters are used as the polarizing filter unit for the right eye 4 and the polarizing filter unit for the left eye 5, liquid crystal display devices 1, 101, 201 and the polarizing filters are of the linear polarization. However, circular polarization may be used in a similar manner to acheve similar favorable results.

So, according to the present invention, the movement of the head of the viewer 13 may be automatically followed in a manner as described above. Moreover, by controlling the position of the stereo vision area 18 in meeting with the movements of the head of the viewer 13, the eye of the viewer 13 may be positioned at all times in the stereo vision area 18 so that a high precision stero image can be viewed even in case the head of the viewer 13 is deflected in the left and right direction.

Second Embodiment

The second embodiment is directed to liquid crystal display apparatus which is able to cope with movements in the up-and-down direction of the head of the viewer 13 and which is able to demonstrate a stereo imag of high accuracy in a manner free from crosstalk of the picture information. The parts or components which are the same as those of the first embodiment are depicted with the same reference numerals and are not explained herein specifically.

Figure 23:
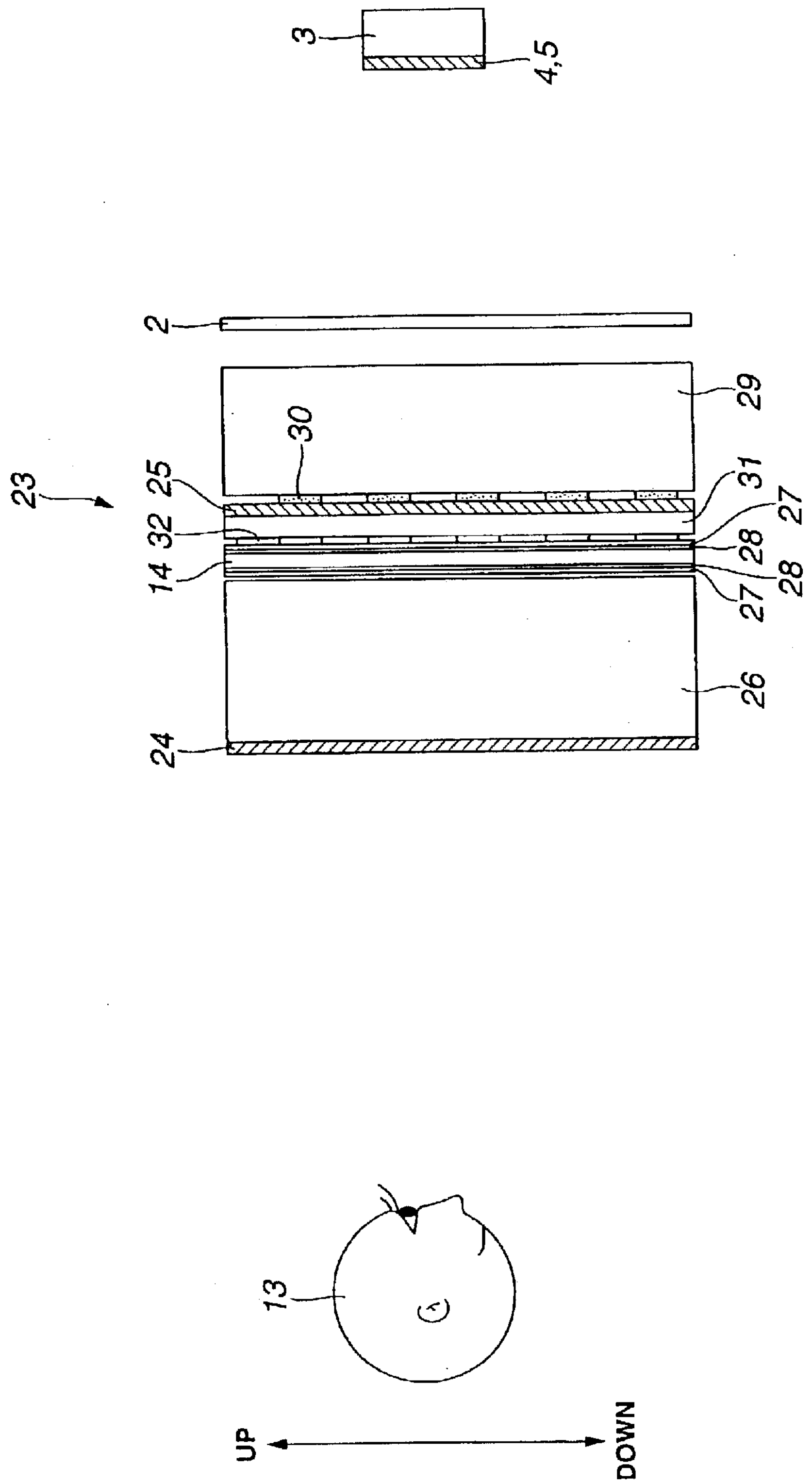
FIG. 23 is a schematic longitudinal cross-sectional view showing the liquid crystal display apparatus of a second embodiment of the present invention.

FIG. 23 is a longitudinal cross-sectional view schematically showing a typical configuration of a liquid crystal display apparatus embodying the present invention.

First, the structure of the liquid crystal display apparatus is explained. At a preset distance from the back surface of a liquid crystal display device 23 is arrayed a Fresnel lens 2 operating as a convex lens as optical means.

At a preset distance from the back surface of the Fresnel lens 2 is arrayed a back light 3 as a light source for illuminating the liquid crystal display device 23 from its back side. On the front side of the back light 3, that is on the light illuminating side thereof, a polarizing filter unit for the right eye 4 and a polarizing filter unit for the left eye 5 are arranged on left and right sides of the center of the back light 3 as a boundary. The polarizing filter unit for the right eye 4 and the polarizing filter unit for the left eye 5 are formed as linear polarizing filters having the direction of polarization extending at right angles to each other, with the polarizing filter unit for the right eye 4 and the polarizing filter unit for the left eye 5 having the rightward ascending plane of polarization and the leftward ascending plane of polarization, respectively.

The liquid crystal display device 23 is of the light transmitting type and includes a light modulator 14, a first polarizing filter 24 arranged on the side viewer of the light modulator 14 and a second polarizing filter 25 arranged on the inner surface towards the back light 3 of the light modulator 14.

The light modulator 14 includes liquid crystals twisted 90° in a pair of glass substrates 26, 29. If no voltage is applied across a pair of the transparent electrode plates, the incident light is radiated as its plane of polarization is rotated through 90° and, if voltage is applied across a pair of the transparent electrode plates, the incident light is directly radiated, without rotating its polarization plane. A protective film 27 is formed on the inner surface of the first glass substrate 26, which is the one of the paired glass substrates directed to the viewer 13, that is a major surface thereof holding the liquid crystal. On the protective film 27 is formed a transparent electrode plate 28 formed of ITO. A color filter 32 is formed through a transparent protective layer 31 on the inner surface of the second glass substrate 29, which is the one of the paired glass substrates directed to the back light 3, that is on the major surface thereof holding the liquid crystal. On the major surface of the color filter 32 is formed a protective film 27 on which is formed a transparent electrode plate 28 of ITO. A plural number of half wave plates 30 are mounted on the major surface of the second polarizing filter 15 every other horizontal line of the light modulator 14.

The first and second polarizing filters 24, 25 are linear polarizing filters having the same plane of polarization over the entire surfaces, with the two plane of polarizations being set to a perpendicular direction relative to each other. Towards the second glass substrate 29 of the second polarizing filter 25 are annexed a plural number of half wave plates 30 every other horizontal line of the light modulator 14. These half wave plates 30 are adapted to emit the incident light as it rotates the polarizing plane thereof through 90°, as shown in FIG. 20.

In FIG. 21, the polarized light in the leftward ascending direction cannot traverse the polarizing filter line in the absence of the half wave plates 30. If these half wave plates 30 are provided, the polarized light in the leftward ascending direction is rotated 90° and prove the polarized light in the rightward ascending direction and hence can traverse the polarizing filter line. Conversely, the polarized light in the rightward ascending direction can traverse the polarizing filter line in the absence of the half wave plates 30. If these half wave plates 30 are provided, the polarized light in the rightward ascending direction is rotated 90° and prove the polarized light in the leftward ascending direction and hence cannot traverse the polarizing filter line. The direction of polarization of the light which has just entered the second polarizing filter is unexceptionally in the rightward ascending direction so that the direction of polarization first polarizing filter 24 may unexceptionally be in the leftward ascending direction to permit facilitated fabrication.

On the other hand, the light modulator 14 of the liquid crystal display device 23 is constructed and designed so that the picture information for the right eye and that for the left eye are alternately demonstrated every other horizontal line in agreement with the light transmitting lines of the first and second polarizing filters 24, 25.

In the present invention, the second polarizing filter 25 is arranged not on the outer side but within the liquid crystal display device 23. By arranging the second polarizing filter 25 not on the outer side but within the liquid crystal display device 23, the liquid crystal arranged within the light modulator 14 may be extremely proximate to the second polarizing filter 25, with the distance therebetween being diminished appreciably.

Figure 6:
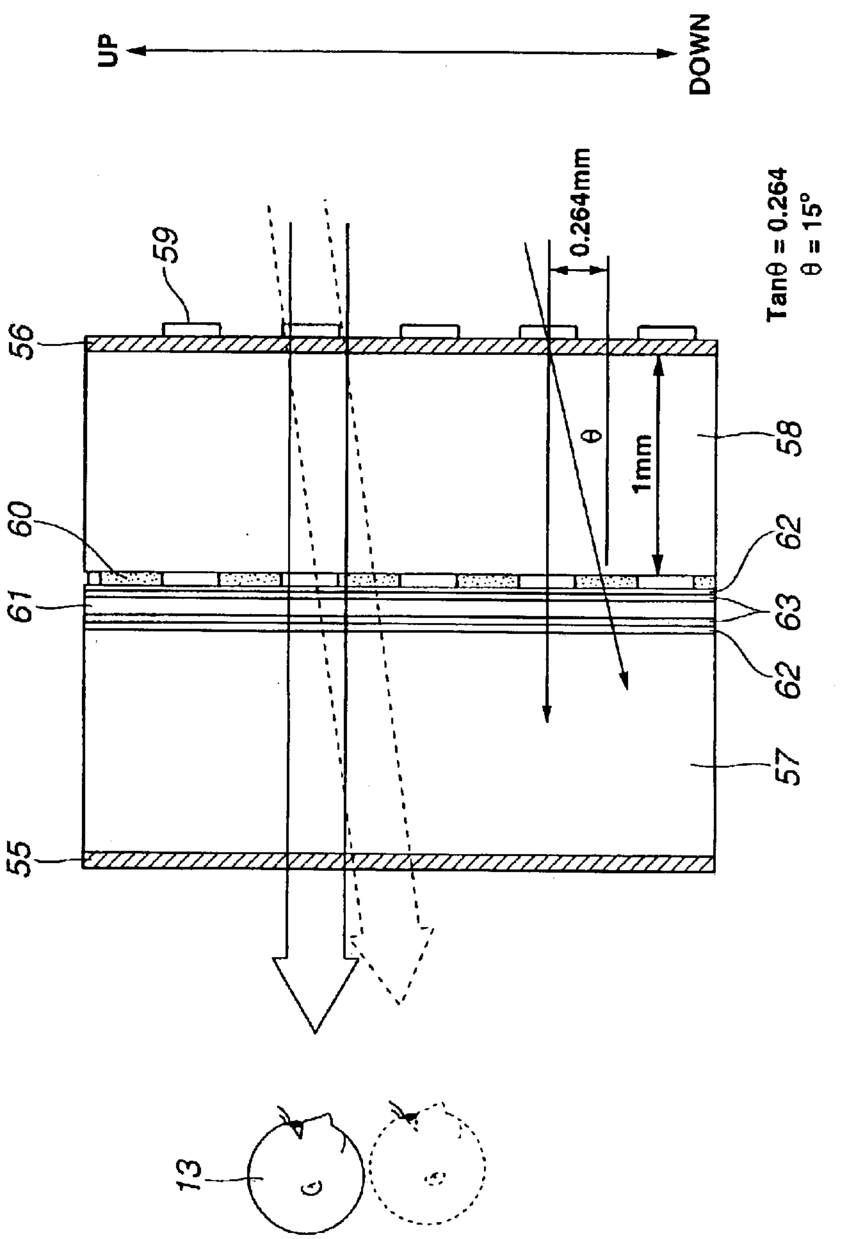
FIG. 6 is a plan view showing the state in which a surface light source is substituted for a point light source in a point light source system to form a 3D display apparatus.

The light incident on the second polarizing filter 25 is desirably incident in its entirety in a direction perpendicular to the polarizing filters 23, 24. In actuality, however, there is the light incident from an oblique direction to the major surfaces of the polarizing filters 24, 25. In this case, the light incident on the major surfaces of the polarizing filters 24, 25 from the oblique direction is incident not on the horizontal line of the light modulator 14 corresponding to the light incident position of the polarizing filters 23, 24 but on the horizontal line offset from the above-mentioned horizontal line. The result is that the image information on the horizontal line which inherently should not be visible enters the eye as it is superposed as cross-talk on the inherent image information to render the image extremely difficult to view. This is ascribable to such a situation in which, as in the case explained in connection with FIG. 6, the left and right images, separated from one horizontal line to another in the half wave plates 30 cannot be incident in impeccable registry with the color filter 32 or with the light modulator 14 but are incident astride two horizontal lines of the color filter 32 and the light modulator 14, such that the image for the right eye and that for the left eye are simultaneously illuminated on, for example, the right eye.

It is noted that the deviation from the horizontal line on which the light should inherently fall becomes larger the longer the distance between the second polarizing filter 25 and the pixel in the light modulator 14. That is, by diminishing the distance between the polarizing filter on the side back light and the pixel, it is possible to prevent the image information on the line which inherently should not be visible from entering the eye as cross-talk by being superimposed on the inherent image information. This phenomenon occurs when the head of the viewer 13 is moved in the up-and-down direction, in which case the image information on the line which inherently should not be visible enters the eye as cross-talk by being superimposed on the inherent image information to render the image extremely difficult to view.

So, according to the present invention, the second polarizing filter is arranged not on the outer side but within the liquid crystal display device 23, whereby the second glass substrate 29 may be eliminated from a space between the liquid crystal arranged in the light modulator 14 on one hand and the second polarizing filter 25 and the half wave plates 30 on the other to provide for a shorter distance therebetween to establish an extremely proximate state. This prevents cross-talk of the image information even in case the head of the viewer 13 is moved in the up-and-down direction, while enabling the viewer to see a high precision stereo view.

Moreover, since the present liquid crystal display device 23 includes the color filter 32, it is possible to transmit only the light of a preset wavelength as well as to create an image of a desired color. There is no particular limitation to the color filter 32 such that any suitable known type of the color filter may be used.

The liquid crystal display device 23 may be fabricated as follows:

First, the protective film 27 is formed on the inner major surface of a first glass substrate 26, as a substrate on the side viewer 13, that is on the major surface holding the liquid crystal, and a transparent electrode plate 28 of ITO is formed on the protective film 27.

On the other hand, a linear polarizing plate, having the same plane of polarization on its entire surface, is bonded, as a second polarizing filter 25, on one major surface of the transparent protective layer 31, arranged between the first glass substrate 26 as the viewer side substrate and the second glass substrate 29 as the back light side substrate.

On this second polarizing filter 25 are bonded half wave plates 30 in register with every other line of the light modulator 14.

Then, on the opposite side major surface of the transparent protective layer 31, there is formed the color filter 32, and the transparent electrode plate 28 of ITO is formed on the protective film 27.

The first glass substrate 26 and the transparent protective layer 31 then are bonded together so that the respective transparent electrode plates 28 thereof face each other. The second glass substrate 29 then is bonded to the transparent protective layer transparent protective layer 31 so that the respective transparent electrode plates 28 face each other. The second glass substrate 29 then is bonded to the major surface of the transparent protective layer 31 on the major surface of the transparent protective layer 31 carrying the half wave plates 30.

The liquid crystal then is poured and sealed into a space between the paired transparent electrode plates 28. On the front major surface of the first glass substrate 26, a linear polarizing plate, having the same plane of polarization on its entire surface, is bonded as the first polarizing filter 24, so that the Brewster angle of the first polarizing filter and that of the second polarizing filter will be at right angles to each other, to complete the desired liquid crystal display device 23.

For forming the half wave plates 30, the following method may also be used. First, a half wave plate 29 of approximately the same size as the second glass substrate 29 is bonded on the second glass substrate 29, such as with lamination, and a mask having an opening every other horizontal line of the light modulator 14 is superimposed on the second glass substrate 29. The resulting assembly is irradiated with e.g., te infrared laser. This locally heats the high molecular material of the portions of the half wave plates 30 irradiated with the laser light to a temperature not lower than the transition temperature to set up an amorphous state to eliminate the phase difference. So, the half wave plates 30 may be formed every other horizontal line on the light modulator 14.

The respective pixels in the light modulator 14 are hereinafter explained. In the space between adjoining pixels in the l14, there are lattice-shaped areas, termed black stripes, which do not transmit light. Three color filters 32 of red, green and blue (R, G and B) are provided for respective pixels on split areas obtained on splitting each pixel in e.g., in the left-and-right direction. The light volumes of the red, green and light can be adjusted by adjusting the driving voltage of the areas of the light modulator 14 associated with the respective split areas to provide for color display. The same holds for a modification of the second embodiment insofar as the color filters 32 or equivalent devices are used to realize color display. In such case, the corresponding explanation is omitted for clarity.

A first modification of the liquid crystal display device 23 for a second embodiment is hereinafter explained. In the following, a liquid crystal display device 123 is explained as a first modification of the liquid crystal display device 23.

Figure 25:
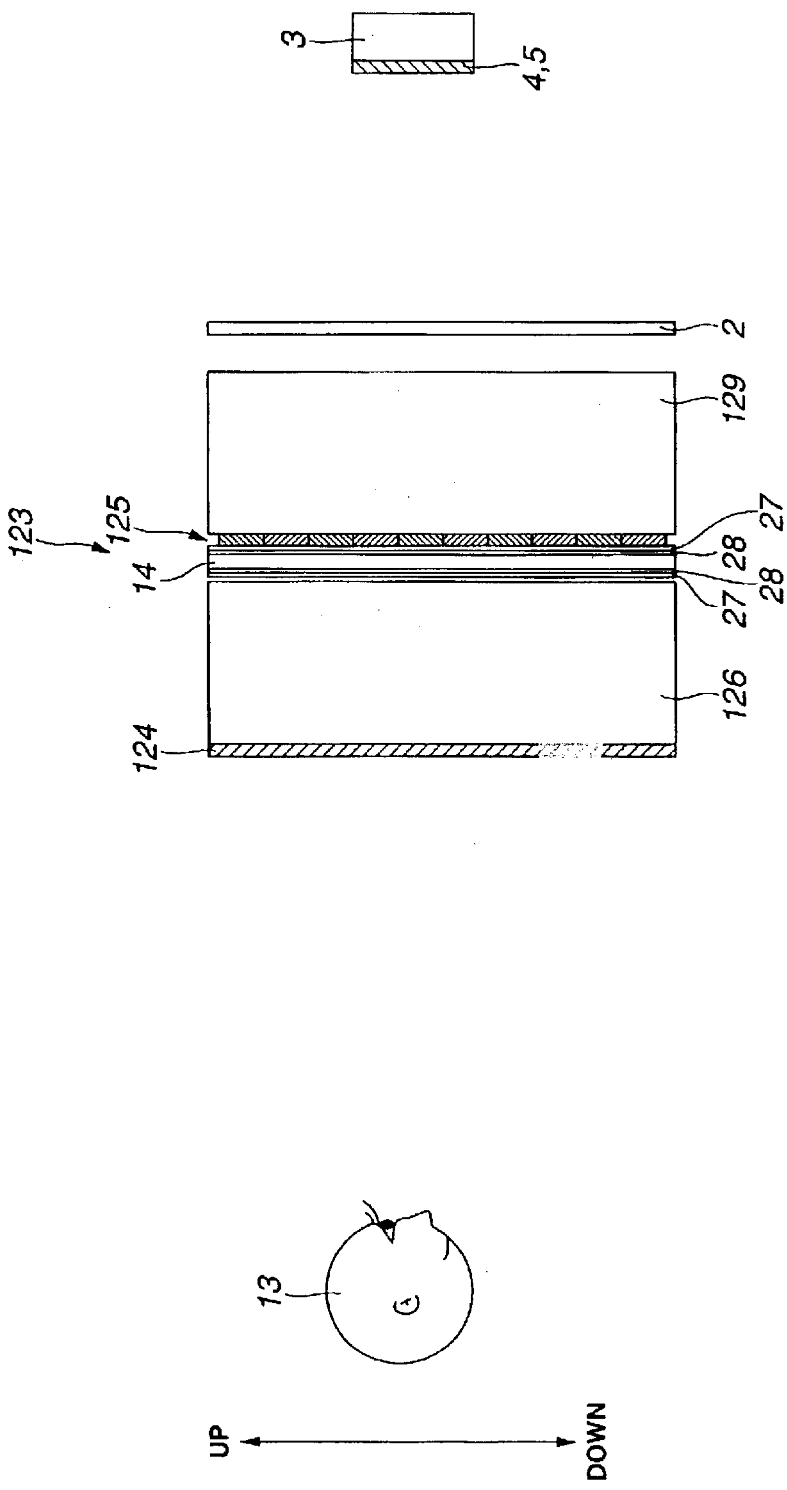
FIG. 25 is a longitudinal cross-sectional view showing a first modification of the second embodiment.
Figure 26:
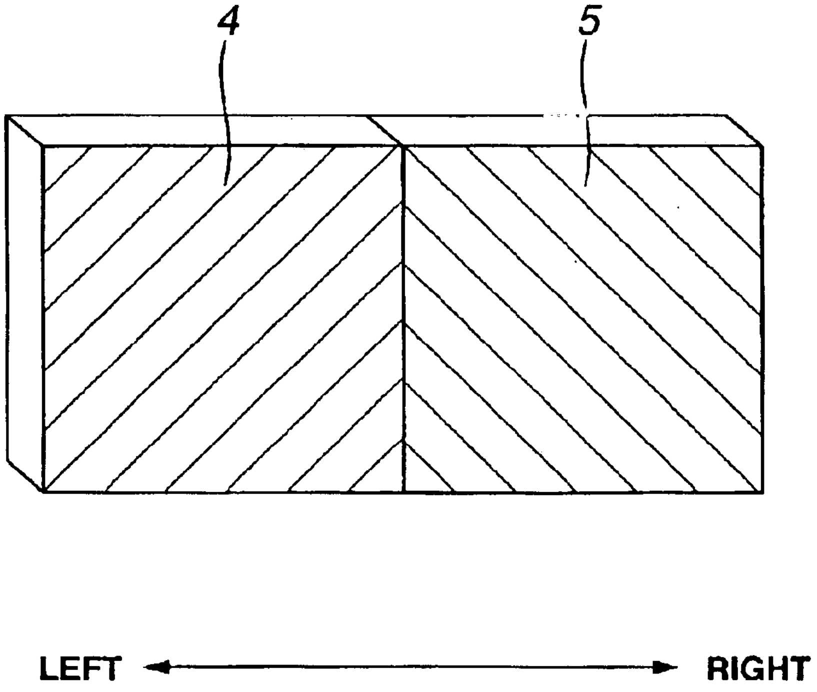
FIG. 26 is a schematic view, as seen from the viewer, of a polarizing filter unit for a right eye and a polarizing filter unit for a left eye on the back light in the first modification of the second embodiment.

Referring to FIG. 25, the liquid crystal display device 123 is of the light transmitting type and includes a light modulator 14, a first polarizing filter 124 arranged on the side viewer 13 of the light modulator 14 and a second polarizing filter 125 arranged on the inner surface of the side back light 3 of the light modulator 14. Referring to FIG. 26, the back light 3 includes a polarizing filter unit for the right eye 4, having a rightward ascending plane of polarization, and a polarizing filter unit for the left eye 5, having a leftward ascending plane of polarization, on the illuminating side. The light modulator 14 includes liquid crystals twisted 90° in a pair of glass substrates. If no voltage is applied across a pair of the transparent electrode plates, the incident light is radiated as its polarization surface is rotated through 90° and, if voltage is applied across a pair of the transparent electrode plates, the incident light is directly radiated, without rotating its polarization plane.

A protective film 27 is formed on the inner surface of the first glass substrate 126, which is the one of the paired glass substrates directed to the viewer 13, that is on the major surface thereof holding the liquid crystal. On the protective film 27 is formed a transparent electrode plate 28 formed of ITO. A second polarizing filter 125 of the second one 129 of the paired glass substrates facing the back light 3 has a second polarizing filter 125 on its inner surface, that is on its major surface holding the liquid crystal. On the protective film 27 is formed the transparent electrode plate 28.

The first polarizing filter 124 is formed as a linear polarizing filter having the same plane of polarization over its entire surface.

The second polarizing filter 125 is formed by rightwardly ascending linear polarizing filter lines arranged in alternation with leftwardly ascending linear polarizing filter lines. The second polarizing filter 125 is arranged so that the rightwardly ascending linear polarizing filter lines or the leftwardly ascending linear polarizing filter lines will be in the same direction as the plane of polarization of the first polarizing filter 124.

In this case, the state of the transmitting light to the light modulator 14 in case no voltage is applied across a pair of orientation films, that is a pair of the transparent electrode plate 28, differs depending on the horizontal lines. That is, since there are a normal white mode and normal back mode, the driving condition (driving voltage) of the light modulator 14 is set reversely with respect to the routine normally white mode for the horizontal line, for which the direction of polarization is the same for the first and second polarization filters 124, 125, so that driving is performed in the normally black mode.

In a first modification, the second polarizing filter 125 is formed by a layer containing a polarizing material. As the polarizing material, a lyotropic (density transition type) liquid crystal dichromic molecules may preferably be employed. The lyotropic liquid crystal dichromic molecules exhibit liquid crystal properties if the solvent is left and hence are oriented depending on the directly underlying layer of the dichromic molecules. When dried, the dichromic molecules are solidified in the crystal or amorphous state as this orientation is kept to exhibit the properties as the polarizing device.

The liquid crystal display device 123 may be fabricated as follows:

First, the protective film 27 is formed on the inner major surface, that is on the liquid crystal holding side major surface, of the first glass substrate 126, as a substrate on the side back light 3, and the transparent electrode plate 28 of ITO is formed on the protective film 27.

Then, a solution for the orientation layer is coated on the inner major surface, that is on the liquid crystal holding side major surface, of the second glass substrate 129. A mask having openings in register with every other horizontal line is superimposed on the major surface coated with an optically active solution for the orientation layer and light having an electrical field vector in a desired polarizing direction is illuminated for orientation.

The mask is shifted in the up-and-down direction by one horizontal line and, as the substrate is rotated 90°, the light is illuminated to form an orientation layer.

Moreover, using a polarizing device having the direction of polarization extending at right angles on the line basis, prepared in the course of fabrication of this substrate, as a mask, orientation processing may be achieved by non-polarizing lumped light exposure.

If necessary, the orientation may be fixed by heating.

As the material for the orientation layer, high molecular materials, such as polyvinyl alcohol, polyimide or polyacrylate, may be used. Film forming may be by any suitable known methods, such as a spin coating method, a printing method or a casting method. An ultra-thin film, such as Langmuir project film or a self-organizing film, may be used.

If the polarizing filter portion is formed in a split form, as described above, such molecules that may become anisotropic on irradiation with linear polarized light and that exhibits liquid crystal orientation capability may preferably be used. It is possible to use optically active molecules that produce changes in orientation of the molecular axes by linear polarization, such as azobenzene or stilbernzene.

As the method for orienting the orientation layer, thus formed, in a preset direction, the above-described optical orientation method is used if the polarizing filter portion is split. If it is unnecessary to split the polarizing filter portion, a rubbing method may preferably be used. The rubbing method, consisting in mechanically rubbing a high molecular resin film with e.g., a cloth, is conveniently used for orienting liquid crystals. The preset direction is such a direction in which the dichromic molecular layer, the orientation in which is induced by an orientation layer, exhibits the function as a preset polarizing optical device.

As an alternative method, it is possible to provide a resin film layer having a liquid crystal orienting capability, such as polyimide, to coat it with a resist on the line basis to effect rubbing, to remove the resist, to coat the rubbed portion with a resist and to effect rubbing as the substrate is rotated 90°.

The orientation layer, thus prepared, is coated with a solution of the lyotropic liquid crystal dichromic molecules. Although gray pigments may be used as this dichromic molecules, it is possible and desirable for the polarizing device to exhibit a color filter function by pattern coating a solution of lyotropic liquid crystal dichromic molecules by printing.

It is also possible to provide an adhesive layer on a preset substrate and to bond the adhesive layer on the dichromic molecular layer prepared at the outset on a separate substrate, with the substrate then being peeled off.

The protective film 27 then is formed on the layer of the dichromic molecules and the transparent electrode plate 28 of ITO is formed on this protective film 27.

The first glass substrate 126 and the second glass substrate 129 are bonded together so that the respective ITO transparent electrode plates 28 face each other and the liquid crystal then is poured and sealed. A linear polarizing plate, having the same plane of polarization on its entire surface, is bonded, as the first polarizing filter 124, to the front major surface of the first glass substrate 126, so that the plane of polarization of the first polarizing filter 124 and the plane of polarization of the second polarizing filter 125 are at right angles to each other, to complete the desired liquid crystal display device 123.

On the above-mentioned orientation layer, solutions of red, green and blue lyotropic liquid crystal dichromic molecules are sequentially printed and dried in situ by a printing method or by a roll coating method to complete the liquid crystal display device 123 also having the color filter function.

Figure 27:
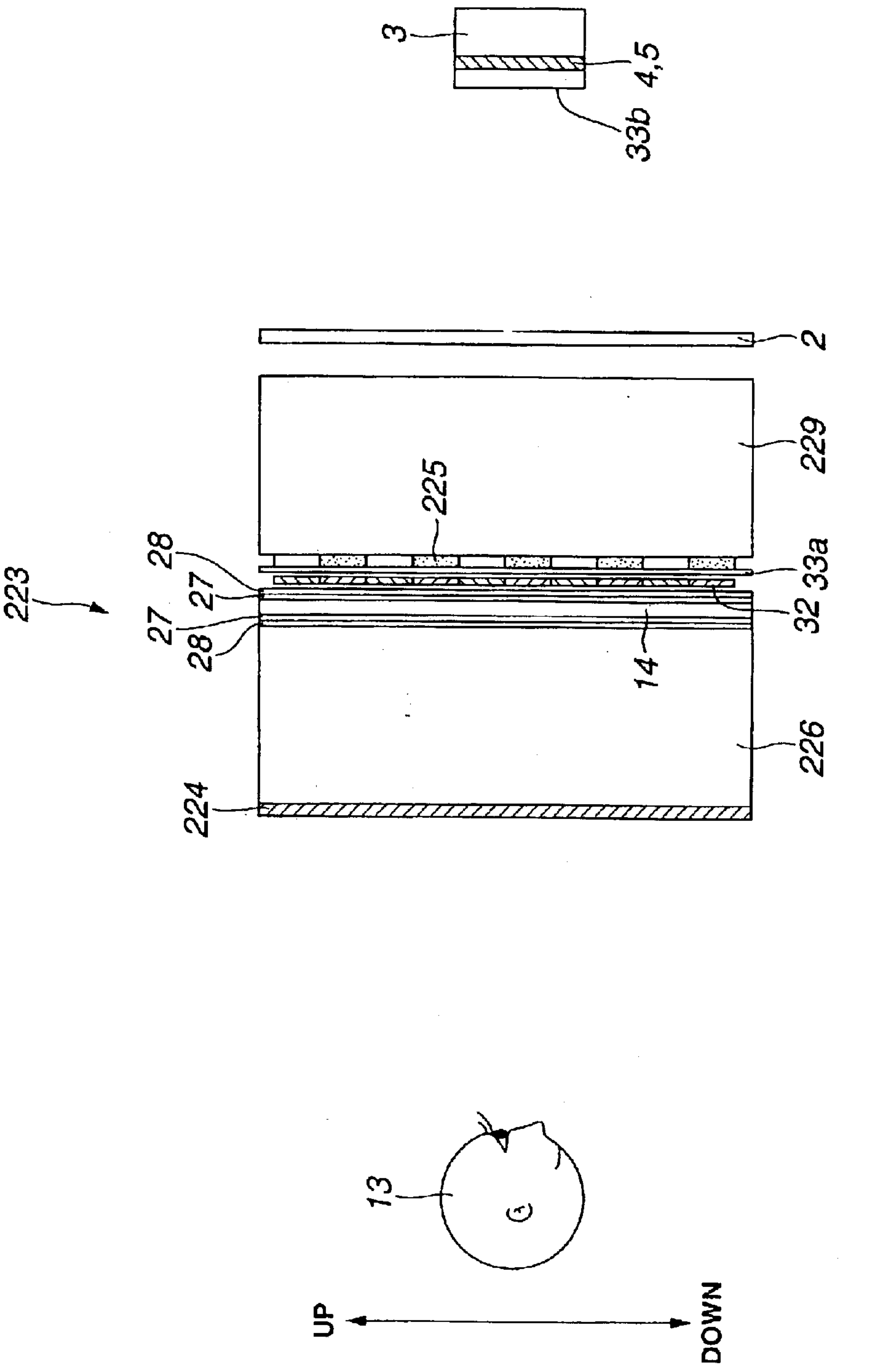
FIG. 27 is a longitudinal cross-sectional view showing a liquid crystal display apparatus of a second modification of the second embodiment.

A second modification of the liquid crystal display device 23 in the second embodiment is now shown. In the following, the second modification of the liquid crystal display device 23 is explained as a liquid crystal display device 223 shown in FIG. 27.

The liquid crystal display device 223 is of the light transmitting type and includes a light modulator 14, a first polarizing filter 224 arranged on the side viewer 13 of the light modulator 14 and a second polarizing filter 225 arranged on the inner surface of the side back light 3 of the light modulator 14. The light modulator 14 includes liquid crystals twisted 90° in a pair of glass substrates. If no voltage is applied across the transparent electrode plates, the incident light is radiated as its polarization surface is rotated through 90° and, if voltage is applied across the transparent electrode plates, the incident light is directly radiated, without rotating its polarization plane.

A protective film 27 is formed on the inner surface of the first glass substrate 126, which is the one of the paired glass substrates directed to the viewer 13, that is a major surface thereof holding the liquid crystal. On the protective film 27 is formed a transparent electrode plate 28 formed of ITO. On the inner surface of the second glass substrate 129', as the back light side substrate of the paired glass substrates, that is on the major surface of the liquid crystal holding side, a second polarizing filter 225 is formed, on the major surface of which a quarter wave plate 33*a* is formed. On the quarter wave plate 33*a* are formed color filters 32, on which a protective film 27 and a transparent electrode plate 28 of ITO are formed.

Figure 28:
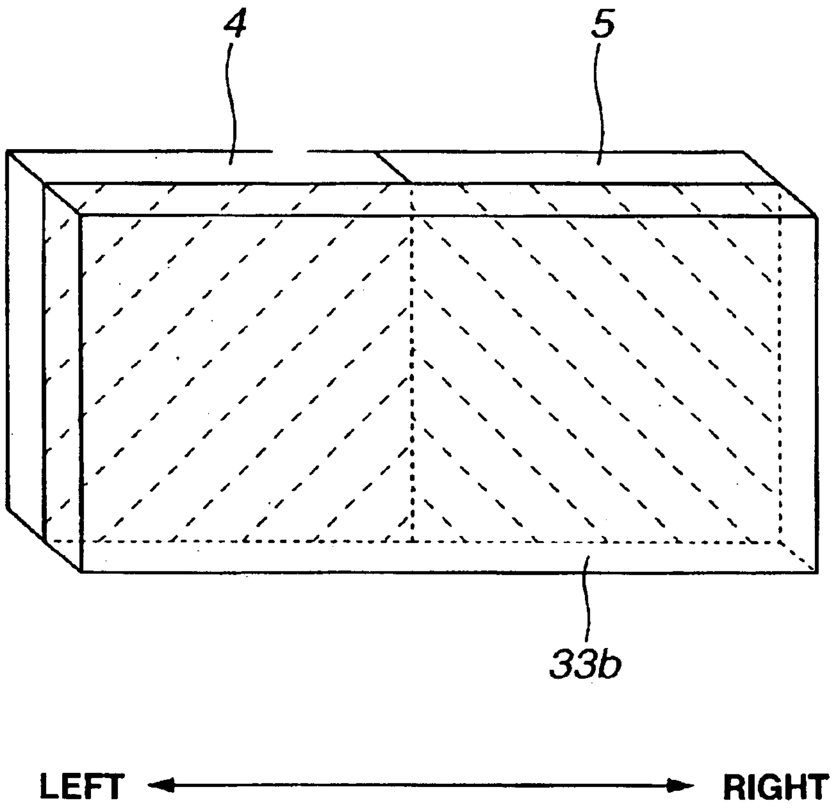
FIG. 28 is a schematic view, as seen from the viewer, of a polarizing filter unit for a right eye, a polarizing filter unit for a left eye and a quarter wave plate on the back light in the second modification of the second embodiment.

On the illuminating side of the back light 3, there is arranged a quarter wave plate 33 on the front sides, that is on the light radiating sides, of the polarizing filter unit for the right eye 4 and the polarizing filter unit for the left eye 5, as shown in FIG. 28. Thus, the linear polarized light beams, emitted by the back light 3 and which traverse the polarizing filter unit for the right eye 4 and the polarizing filter unit for the left eye 5 in perpendicular directions to each other, are converted by a quarter wave plate 33*b* into right rotating circular polarized light and into the left rotating circular polarized light which are perpendicular to each other. That is, the right rotating polarized light and left rotating circular polarized light, perpendicular to each other, are incident on the second polarizing filter.

It should be noted that the second polarizing filter 225 is formed of a circular polarized light separating material. As this circular polarized light separating material, cholesteric liquid crystal, for example, may preferably be used. The cholesteric liquid crystals totally reflect the circular polarized light having the same spiral direction as the spiral direction of the orientation of the liquid crystal molecules, while transmitting only the circular polarized light of the reverse direction. Thus, if the back light 3 is divided into the right circular polarized light and left circular polarized light for left and right eyes, it is possible to make separation on the horizontal lines of the light modulator 14. So, the second polarizing filter 225 is formed by alternately arraying the cholesteric liquid crystal having the different spiral directions of orientation of the liquid crystal molecules every other horizontal line. Therefore, on a horizontal line formed by cholesteric liquid crystals having the right rotating spiral direction of orientation of the liquid crystal molecules in the second polarizing filter 225, the right rotating circular polarized light is reflected to permit passage only of the left rotating circular polarized light. On the horizontal line formed by cholesteric liquid crystals having the left rotating spiral direction of orientation of the liquid crystal molecules, the left rotating circular polarized light is reflected to permit passage only of the right rotating circular polarized light, and hence the cholesteric liquid crystals separate the light into the light for right eyes and that for left eyes. The light separated by the cholesteric liquid crystals, that is by the second polarizing filter 225, and transmitted, is converted by the quarter wave plate 33*a* into respective perpendicular linear polarized light. If the first polarizing filter 24 is formed by a linear polarizing filter having a plane of polarization on its entire surface coincident with the Brewster angle of one of the mutually perpendicular linear polarized light beams transmitted through the quarter wave plate 33*a*, the driving form is similar to the first modification described above.

The liquid crystal display device 223 may be prepared as follows:

First, the protective film 27 is formed on the inner major surface, that is on the liquid crystal holding side major surface, of the first glass substrate 226, as a substrate on the side viewer 13, and the transparent electrode plate 28 of ITO is formed on the protective film 27.

On the inner major surface, that is on the liquid crystal holding side major surface, of the second glass substrate 229, as a substrate on the side back light 3, right or left rotating cholesteric liquid crystals are formed by printing or roll coating method every other horizontal line of the light modulator 14, as the second polarizing filter 225, to form a solidified cholesteric liquid crystal layer by adjusting the wavelength range of the reflected light so as to be uniform in the entire visible light range, for example, the wavelength range from 400 to 850 nm. In the horizontal line therebetween, left or right rotating cholesteric liquid crystals are provided. The sequence of providing the cholesteric liquid crystal layers may be reversed or concurrent as desired.

The quarter wave plate 33*a* then is formed on the cholesteric liquid crystal layer and the color filters 32 are formed thereon.

The protective film 27 then is formed on the cholesteric liquid crystal layer and the transparent electrode plate 28 of ITO is formed on the protective film 27.

The first glass substrate 226 and the second glass substrate 229 are bonded together so that the respective ITO transparent electrode plates 28 face each other and the liquid crystal then is poured and sealed. A linear polarizing plate, having the same plane of polarization on its entire surface, as the first polarizing filter 224, is bonded to the front major surface of the first glass substrate 226 to complete the desired liquid crystal display device 223.

In the cholesteric liquid crystal layer, the circular polarized light in the direction opposite to the spiral direction is transmitted, whilst the circular polarized light of the same direction as the spiral direction is selectively reflected. That is, by adjusting the pitch of helix to adjust the wavelength corresponding to the product of the pitch of helix and the refractive index of the liquid crystal, the light of the entire wavelength in the visible range can be reflected to permit the use as a separating film and as a color filter.

For example, the fact that the pitch of the cholesteric liquid crystals is changed appreciably with the temperature is exploited to heat the substrate carrying the cholesteric liquid crystals from its lower portion to create a temperature distribution in the up-and-down direction of the substrate. By employing corresponding masks, the temperature distribution can be controlled to afford desired pitch values. By mixing a polymerization initiator of a suitable concentration, the state of the pitch can be fixed on light irradiation to form a selective wavelength transmission film.

Thus, although separate color filters may be provided, such as the color filters 32, mentioned above, a left rotating or right rotating cholesteric liquid crystal layer may be provided on the right rotating or left rotating spiral cholesteric liquid crystal line on the substrate which selectively transmits only e.g., red light by adjusting the pitch of helix. By providing lines by cholesteric liquid crystals sequentially transmitting green and blue, it becomes possible for the cholesteric liquid crystal layers to perform the role of the color filter simultaneously.

The polarizing filter, playing the role of the color filter simultaneously, may e.g., be fabricated as follows:

Preferably, a chiral nematic liquid crystal is used for this liquid crystal layer and only the chiral component accounts for the difference between right rotating and left rotating portions. These cholesteric liquid crystal layers are provided every other horizontal line and temperature distribution is created in the up-and-down direction from the lower substrate portion to create distribution in the selective transmission wavelength. When the transmitted light is red (wavelength: 600 to 700 nm), the ultraviolet light is illuminated through a mask for photo-curing. When next the transmitted light is green, the ultraviolet light is illuminated through a mask for photo-curing. Similarly, when the transmitted light is blue, the ultraviolet light is illuminated through a mask for photo-curing. By providing the quarter wave plate 33*a*, a polarized light separating substrate having the function of the color filter 32 simultaneously may be produced.

Figure 29:
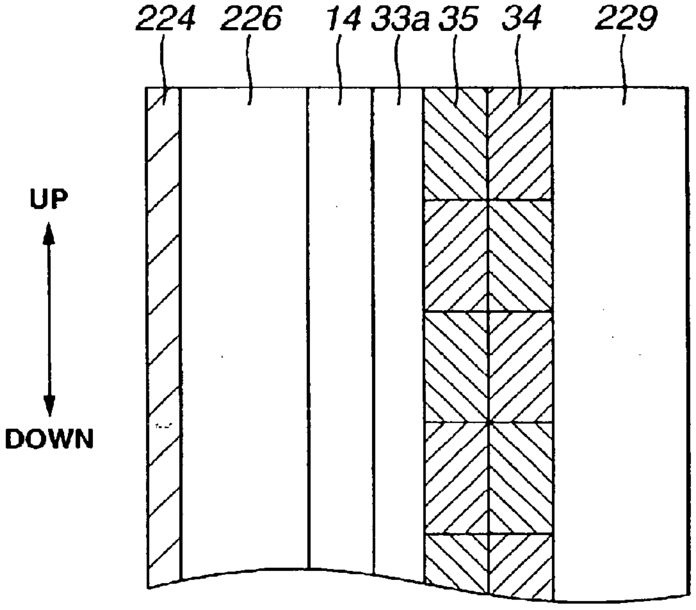
FIG. 29 is a longitudinal cross-sectional view showing a typical liquid crystal display device having the function as a color filter.

It is also possible to provide a cholesteric liquid crystal layer, playing the role of the color filter, laterally of the cholesteric liquid crystal layerused for separating the right rotating circular polarized light and the left rotating circular polarized light from each other. That is, referring to FIG. 29, a first cholesteric liquid crystal layer 34 is provided on the second glass substrate 229 for separating the right rotating circular polarized light and the left rotating circular polarized light from each other, and a second cholesteric liquid crystal layer 35 then is provided on the first cholesteric liquid crystal layer 34 for separating only the light of a specified wavelength.

The first cholesteric liquid crystal layer 34 is formed by providing cholesteric liquid crystal layers of different spiral directions, specifically plural cholesteric liquid crystal layers having a right spiral direction and plural cholesteric liquid crystal layers having a left spiral direction, every other horizontal line, such that, on the on the right rotating spiral cholesteric liquid crystal lines, the right rotating circular polarized light and the left rotating circular polarized light undergo total reflection, whilst only the left rotating circular polarized light and the right rotating circular polarized light are transmitted, respectively.

The second cholesteric liquid crystal layer 35 forms a cholesteric liquid crystal layer, as a wavelength selective film, having the direction of helix opposite to that of the first cholesteric liquid crystal layer 34 and adapted for transmitting only the light of a specified color, that is the light of a specified wavelength. These cholesteric liquid crystal layers may be prepared similarly to those of the above-described embodiments.

With the above-described structure, the first cholesteric liquid crystal layer 34 is able to separate the light for the right eye and that for the left eye, whilst the second cholesteric liquid crystal layer 35 is able to separate the light for the left eye, so that the first and second cholesteric liquid crystal layers 34, 35 alone form the second polarizing filter 225 which may be used simultaneously as the color filter 32.

Figure 30:
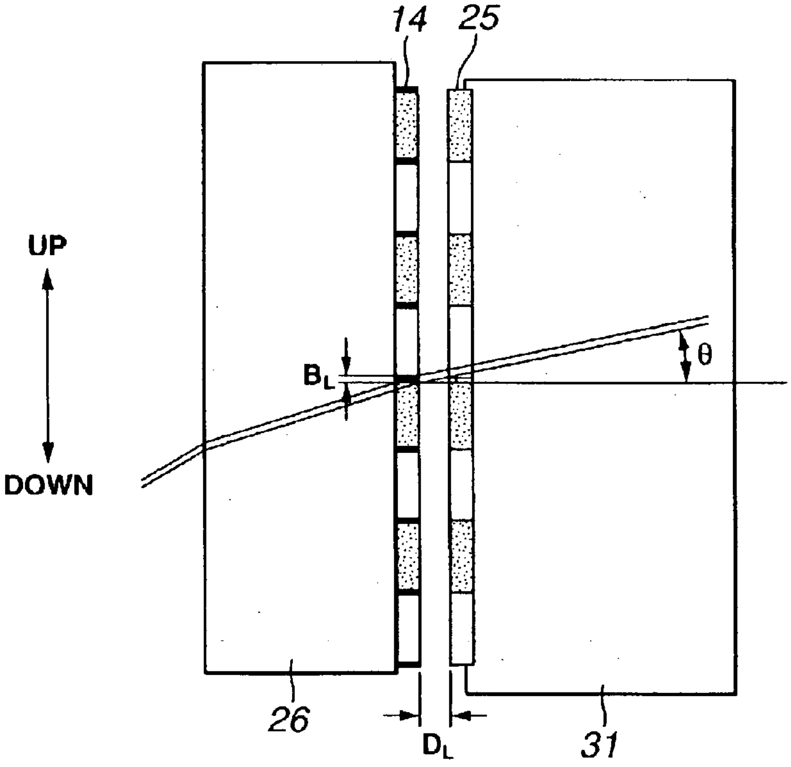
FIG. 30 is a schematic view showing the distance between the light modulator and picture separating means.

Referring to FIG. 30, the spacing between the light modulator 14 and the second polarizing filters 25, 125, 225, as image separating means, is now explained.

Figure 24:
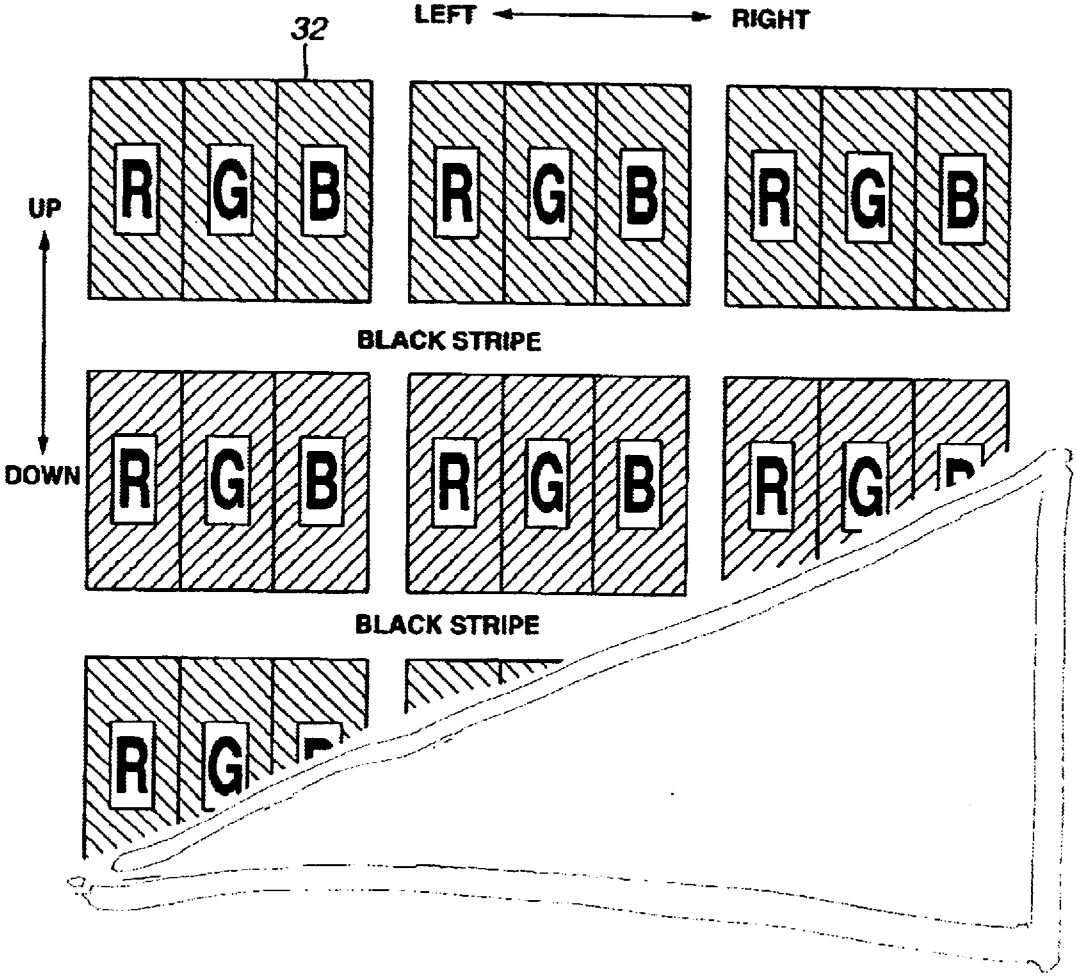
FIG. 24 is a plan view showing essential portions of the light modulation unit and a color filter as seen from the viewer in the second embodiment.

The light modulator 14 has a non-light-transmitting area, called a black stripe, as explained in connection with FIG. 24. This black stripe has a preset width $B_L$, as shown in FIG. 30. This black stripe interrupts the light incident at a preset angle θ in the up-and-down direction on the light modulator 14 and which is incident from a horizontal line of the second polarizing filter 25 not registering with the horizontal line of the light modulator 14. FIG. 30 shows the corresponding light path.

If the spacing between the light modulator 14 and the second polarizing filters 25, 125, 225 is $D_L$ and the preset expected incident angle is θ, the cross-talk may be prevented from occurring if the spacing $D_L$ satisfies the following relation (1):

$$D_L < B_L/2\tan\theta \qquad (1)$$

In actuality, since protective films or layers are not provided between the light modulator 14 and the second polarizing filters 25, 125, 225, $D_L$ denotes the thickness of the protective film or layer. If this thickness is smaller than $B_L/2\tan\theta$, the black stripe becomes the cross-talk margin to render it possible to prevent cross-talk between non-matched horizontal lines.

The method of arraying the above-described image separating function in proximity to the liquid crystal material is not limited to the typical method described above and may be applied to all sorts of the optical systems. For example, such a structure may be used in which a second image separating mechanism is provided next to liquid crystal pixels and in which a first image separating mechanism is provided at a preset distance from the second image separating mechanism. The result is that the degree of freedom in viewer head movements is enhanced such that no cross-talk is produced even if the viewer's head is shifted in the up-and-down direction. Moreover, a stereo image of a higher precision may be viewed. By providing the second polarizing filter in proximity to the liquid crystal material, the second polarizing filter can be prepared in the course of the fabrication of the liquid crystal display device, so that the production cost can be appreciably lower than in the conventional external mounting system.

By combining the first and second embodiments, it becomes possible to improve the degree of freedom un the viewer head movements both in the left-and-right direction and in the up-and-down direction. The result is that the viewer is not required to wear glasses or the like implement, while the viewer may enjoy a highprecision stereo image with an agreeable feeling since the viewer is not bound to the stereo image viewing enabling area.

In the above-described embodiments, the viewer 13 is able to enjoy the stereo image without employing glasses for stereo vision. However, the present invention may naturally be used in a system employing the above-described filter as glasses.

Figure 31:
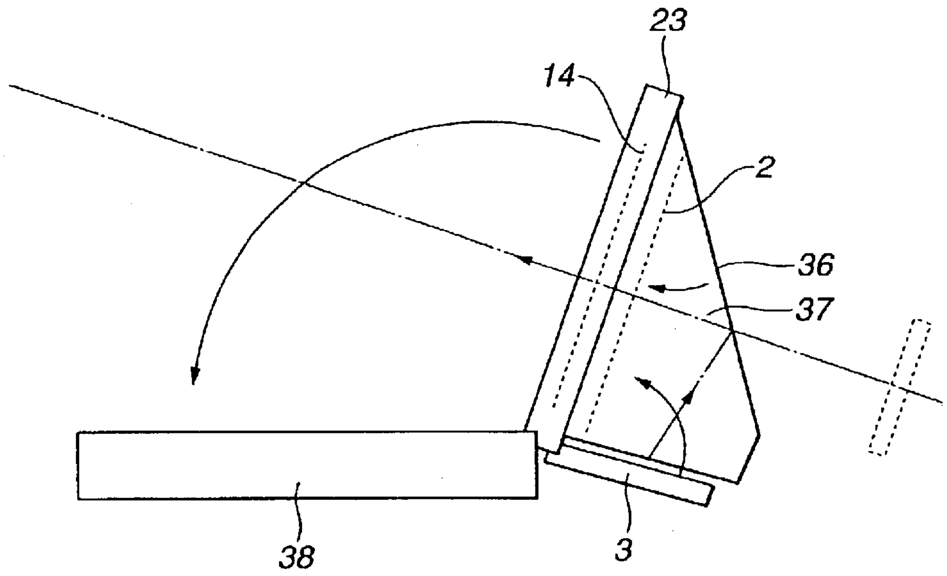
FIG. 31 is a side view showing the opened state of a collapsible liquid crystal display apparatus according to the present invention.
Figure 32:
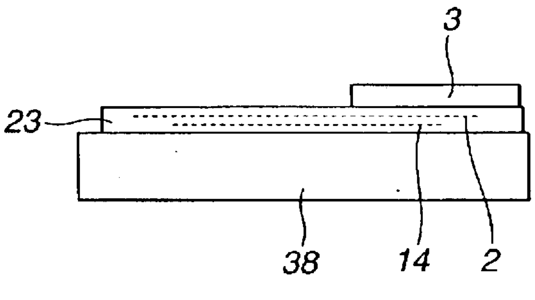
FIG. 32 is a side view showing the collapsed state of a collapsible liquid crystal display apparatus according to the present invention.

Referring to FIGS. 31, 32, the back light 3 may be arranged not in a parallel position but at an angle relative to the liquid crystal display device 23, the liquid crystal display device 23 being then irradiated with light from a plane mirror 36 clamped between a pair of side portions 37, with the side portions 37 and the mirror 36 being collapsed in a container casing 38 during non-use time to reduce the size of the apparatus to realize space saving and improved portability.

Specifically, in demonstrating an image, the liquid crystal display device 23 is uplifted from the state shown in FIG. 32, whereby the mirror 36 and the paired side portions 37 provided for opening/closure in the respective portions of the liquid crystal display device 23 are opened, with the mirror 36 being then clamped between the paired side portions 37 to secure the mirror 36 in stability. The liquid crystal display apparatus in its entirety may be installed in stability on the mounting surface.

The back light 3 then is opened and secured in position so that the light is illuminated properly from the back light 3 to the plane mirror 36, with the light reflected by the mirror 36 being then collected by the Fresnel lens 2 to properly illuminate the light modulator 14.

If, in such case, the Fresnel lens is adapted for being slightly spaced apart from the light modulator 14 as a result of the opening movement of the mirror 36, it becomes possible to render the moire, otherwise produced due to the presence of grooves of the Fresnel lens 2 and the lattice of the light modulator 14, to be less obtrusive. If, moreover, a non-spherical mirror is used as the mirror 36, it becomes possible to eliminate the Fresnel lens 2 to eliminate the moire.

If the mirror 36 is clamped by the side portions 37, as described above, extraneous light may be prevented from entering the light path to prevent stray light from being produced.

INDUSTRIAL APPLICABILITY

In accordance with the present invention, as described above, the movement of the user's head is detected and the position of the stereo vision may be controlled in keeping with the movement of the viewer's head in order to effect automatic correction such that the viewer's eye will be positioned at all times in the stereo vision area. So, the viewer is able to appreciate the high precision stereo image even in case the viewer's head is deflected in the left-and-right direction.

Moreover, according to the present invention, in which the image separating mechanism is mounted next to the pixels, cross-talk of the image information may be prevented from being produced. Thus, the degree of freedom of the movement of the user's head may be improved so that the user is able to appreciate a high precision stereo image evenb if the viewer's heads is deviated in the up-and-down direction.

By combining the above features, there may be provided a liquid crystal display apparatus in which the degree of freedom in the movement of the viewer's head is increased to enable the viewer to enjoy a high precision stereo image.

What is claimed is:

1. A liquid crystal display apparatus comprising:

a liquid crystal display device including a light modulating meansjiaving a front surface and a back side, a first polarizing filter, arranged on the front surface of said light modulating means and a second polarizing filter arranged on the back side of said tight modulating means, said light modulating means including a pair of transparent electrode plates and liquid crystals sealed therein, said light modulating means having a plurality of horizontal lines and being operably configured to separately provide image information for a left eye of a viewer and for a right eye of a viewer via the horizontal lines;

a first light source arranged on the back side of said liquid crystal display device operably configured to generate an illuminating light towards said liquid crystal display device, said first light source having a front surface, a polarizing filter unit deposed to filter light for the right eye of the viewer, arid a polarizing filter unit deposed to filter light for the lefl eye of the viewer, said polarizing filter unit for the right eye and said polarizing filter unit for the left eye having respective different directions of polarization and being fixedly mounted on left and right portions on the front surface of said light source, each of said polarizing filter unit for the right eye and said polarizing unit for the left eye having a front side;

optical means arranged on the back side of said liquid crystal display device to collect the illuminating light from said light source and to direct the so-collected light on said liquid crystal display device;

a second light source arranged on the front sidc of said liquid crystal display device to generate a light on the head of the viewer;

a plurality of light receiving devices arranged on the front sides of said polarizing filter unit for the right eye and the polarizing filter unit for the left eye at a preset spacing therefrom; and position control means for processing and comparing the volumes of the received light in said light receiving devices to control the position of said first light source in the left-and-right direction; wherein the image information for the right eye and that for the left eye are alternately displayed by said light modulating means every horizontal line in agreement with light transmitting lines in said first and second polarizing filters; the light illuminated from said first light source through said polarizing filter unit for the right eye is incident on the right eye of the viewer through said liquid crystal display device, the light illuminated from said first light source through said polarizing filter unit for the left eye is incident on the left eye of the viewer through said liquid crystal display device, independently of the light from said first light source through said polarizing filter unit for the right eye; the volume of light illuminated from said second light source and reflected by the head of the viewer is sensed by said light receiving devices to detect the movement in the left-and-right direction of the head of the viewer; said position control means causing automatic movement of the position of the first light source in the left-and-right direction in agreement with the detected movement.

2. The liquid crystal display apparatus according to claim 1 wherein said first and second polarizing filters each include two linear polarizing falter lines perpendicular to each other for every horizontal line of said light modulating means, such that said first and second polarizing filters each have a polarizing directions perpendicular to each other.

3. The liquid crystal display apparatus according to claim 1 wherein said first and second polarizing filters are linear polarizing filters having the same polarizing directions over the entire surfaces thereof but being perpendicular to each other, and wherein half wave plates are provided every other horizontal line in said second polarizing filter.

4. The liquid crystal display apparatus according to claim 1 wherein said second polarizing filter includes mutually perpendicular linear polarizing filter lines alternately arranged every horizontal line of said light modulating means;

said first polarizing filter being formed by a linear polarizing filter of the same direction as the direction of one of said linear polarizing filter lines of said second polarizing filter; and wherein said light modulating means has a plurality of driving states for the horizontal lines of said light modulating means, the driving states for one horizontal lines having the same direction of polarization of said first and second polarizing filters are set reversely.

5. The liquid crystal display apparatus according to claim 1 wherein, in said position control means, the polarizing filter unit for the right eye and the polarizing filter unit for the left eye are arranged as a plural number of strip-shaped Brewster angle variable type polarizing devices to vary the boundary positions of the mutually perpendicular Brewster angles.

6. The liquid crystal display apparatus according to claim 1 wherein said position control means includes a motor for causing movement of said first light source.

7. The liquid crystal display apparatus according to claim 1 further comprising:

a mirror for reflecting the light emitted by said first light source to said light modulating means and for reflecting the light illuminated from said second light source and reflected by the viewer's head towards said light receiving device.

8. The liquid crystal display apparatus according to claim 7 further comprising:

a pair of side portions for clamping said mirror from both sides thereof.

9. The liquid crystal display apparatus according to claim 8 wherein the mirror and the paired side portions are connected for opening/closure to said light modulating means and wherein, when said light modulating means is driven, said mirror and the paired side portions are opened to clamp said mirror by said paired side portions.

10. A liquid crystal display device comprising:

first image separating means having a first direction of polarization and operably configured to separate the light illuminated from a light source depending on the first direction of polarization;

light modulation means having liquid crystals sealed within a pair of transparent electrode plates, said light modulation means modulating the intensity of light transmitted through said first image separating means;

second image separating means having a second direction of polarization for separating the light transmitted through said light modulating means depending on the second direction of polarization; and a pair of substrates for clamping at least said first image separating means arid said modulating means.

11. The liquid crystal display device according to claim 10 wherein said first image separating means are independent from one horizontal line to another.

12. The liquid crystal display device according to claim 10 wherein said first and second image separating means both include linear polarizing filters having the same polarizing directions over the entire surfaces thereof but being perpendicular to each other, and wherein half wave plates are provided every other horizontal line in said second polarizing filter.

13. The liquid crystal display device according to claim 10 wherein said second image separating means includes mutually perpendicular linear polarizing filter lines alternately arranged every horizontal line of said light modulating means;

said first image separating means being formed by a linear polarizing filter of the same direction as the direction of one of said linear polarizing filter lines of said second polarizing filter; and wherein said light modulating means has a plurality of driving states for the horizontal lines of said light modulating means, the driving states for at least one of the horizontal lines having the same direction of polarization of said first and second polarizing filters are set reversely.

14. The liquid crystal display device according to claim 13 wherein said first image separating means includes an orientation layer oriented in a preset direction and a layer containing a polarizer, said polarizer containing layer being deposited on said orientation layer.

15. The liquid crystal display device according to claim 14 wherein said polarizer is dichromic molecules.

16. The liquid crystal display device according to claim 15 wherein said dichromic molecules are density transition type liquid crystals.

17. The liquid crystal display device according to claim 10 wherein said second image separating means is constructed by alternately arranging layers with a circular polarization separator having respective different twist directions from one horizontal line to another, with a quarter wave plate being arranged on the front side of said layer;

said second image separating means is formed by a linear polarizing filter having the same direction as the direction of one linear polarized light passed through said first image separating means; and wherein said modulating means has a plurality of driving states that are reversely set for horizontal lines for which the direction of polarization of linear light transmitted through said first image separating means is coincident with the second image separating means.

18. The liquid crystal display device according to claim 17 wherein circular polarized light separator is cholesteric liquid crystals.

19. The liquid crystal display device according to claim 10 wherein, said light modulating means has a plurality of pixels with the distance between respective pixels being $B_L$, said modulating means being operably configured to receive light incident at an angie θ, the distance between the respective pixels in said light modulating means and one of the first and second image separating means that is closer to said light modulating means being $D_L$, $D_L$ satisfies the following relation: $D_L<B_L/2\tan\theta$.

20. A liquid crystal display sys,tem employing two polarizing filters having respective different directions of polarization, comprising:

a liquid crystal display device; said liquid crystal display device including:

first image separating means for separating the light illuminated from a light source depending on the direction of polarization of a first of the two polarizing filters;

light modulation means having liquid crystals sealed within a pair of transparent electrode plates, said light modulation means modulating the intensity of light transmitted through said first image separating means;

second image separating means for separating the light transmitted through said light modulating means depending on the direction of polarization of a second of the two polarizing filters; and a pair of substrates for clamping at least said first image separating means and said modulating means.

* * * * *

UNITED STATES PATENT AND TRADEMARK OFFICE

CERTIFICATE OF CORRECTION

PATENT NO. : 6,801,263 B2 
DATED : October 5, 2004
INVENTOR(S) : Seiji Sato and Hidehiko Sekizawa It is certified that error appears in the above-identified patent and that said Letters Patent is hereby corrected as shown below:

Title page, Item [54] and Column 1, line 1,
Title, "LIQUID CRYSTAL DISPLAY, LIQUID CRYSTAL DEVICE AND LIQUID CRYSTAL DISPLAY SYSTEM," should read -- LIQUID CRYSTAL DISPLAY APPARATUS, LIQUID CRYSTAL DEVICE AND LIQUID CRYSTAL DISPLAY SYSTEM --.

Signed and Sealed this

Eighth Day of March, 2005

Jon W. Dudas

JON W. DUDAS
*Director of the United States Patent and Trademark Office*